(12) United States Patent
Nose et al.

(10) Patent No.: US 10,556,308 B2
(45) Date of Patent: Feb. 11, 2020

(54) WORK MACHINE PROVIDED WITH PARALLEL LINK MECHANISM

(71) Applicant: NTN CORPORATION, Osaka (JP)

(72) Inventors: Kenzou Nose, Iwata (JP); Hiroshi Isobe, Iwata (JP); Seigo Sakata, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 146 days.

(21) Appl. No.: 15/751,391

(22) PCT Filed: Aug. 9, 2016

(86) PCT No.: PCT/JP2016/073375
§ 371 (c)(1),
(2) Date: Feb. 8, 2018

(87) PCT Pub. No.: WO2017/026468
PCT Pub. Date: Feb. 16, 2017

(65) Prior Publication Data
US 2018/0236619 A1 Aug. 23, 2018

(30) Foreign Application Priority Data
Aug. 10, 2015 (JP) .................................. 2015-158208

(51) Int. Cl.
*B23Q 1/44* (2006.01)
*B25J 11/00* (2006.01)
(Continued)

(52) U.S. Cl.
CPC ................. *B23Q 1/44* (2013.01); *B25J 11/00* (2013.01); *F16H 21/48* (2013.01); *F16H 21/54* (2013.01); *F16H 25/2204* (2013.01)

(58) Field of Classification Search
CPC ........ B25J 11/00; B25J 9/0096; B25J 9/0072; B25J 9/0048; F16H 21/48; B23Q 1/25; B23Q 1/5456
See application file for complete search history.

(56) References Cited

U.S. PATENT DOCUMENTS 3,824,866 A 7/1974 Schatz
4,988,244 A 1/1991 Sheldon et al.
(Continued)

FOREIGN PATENT DOCUMENTS

CN 2037012 5/1989
CN 1149330 5/1997
(Continued)

OTHER PUBLICATIONS

English Translation by WIPO of the International Preliminary Report on Patentability for International Patent Application No. PCT/JP2016/073375 dated Feb. 22, 2018, 6 pgs.
(Continued)

*Primary Examiner* — Thomas C Diaz

(57) ABSTRACT

A work apparatus includes a parallel link mechanism, a position control actuator, a linear motion mechanism, and a rotating mechanism. The parallel link mechanism includes three or more link mechanisms that couple a distal end side link hub to a proximal end side link hub such that a position of the distal end side link hub can be changed relative to the proximal end side link hub. The position control actuator operates the parallel link mechanism. The linear motion mechanism moves a working body in an axial direction orthogonal to a central axis of the proximal end side link hub. The rotating mechanism is mounted on the distal end side link hub and rotates a work object about a rotation
(Continued)

center axis parallel to a movement direction of the linear motion mechanism when the central axis and a central axis are on the same line.

11 Claims, 20 Drawing Sheets

(51) Int. Cl.
*F16H 21/48* (2006.01)
*F16H 21/54* (2006.01)
*F16H 25/22* (2006.01)

(56) References Cited

U.S. PATENT DOCUMENTS

| | | | |
|---|---|---|---|
| 5,401,128 | A | 3/1995 | Lindem et al. |
| 5,893,296 | A * | 4/1999 | Rosheim ............... G05G 5/03 74/490.03 |
| 5,899,112 | A | 5/1999 | Richter |
| 6,841,964 | B2 | 1/2005 | Osuka et al. |
| 7,396,168 | B2 | 7/2008 | Ajioka |
| 9,522,469 | B2 | 12/2016 | Isobe et al. |
| 9,821,454 | B2 * | 11/2017 | Isobe ..................... B23K 9/12 |
| 2003/0197482 | A1 | 10/2003 | Osuka et al. |
| 2004/0086351 | A1 | 5/2004 | Kim et al. |
| 2006/0050173 | A1 | 3/2006 | Ajioka |
| 2015/0088308 | A1 | 3/2015 | Isobe et al. |
| 2016/0256998 | A1 | 9/2016 | Isobe et al. |

FOREIGN PATENT DOCUMENTS

| | | |
|---|---|---|
| CN | 1451896 | 10/2003 |
| CN | 1671980 | 9/2005 |
| EP | 0 987 087 A2 | 3/2000 |
| JP | 10-29178 | 2/1998 |
| JP | 2000-94245 | 4/2000 |
| JP | 5370120 | 9/2013 |
| JP | 2013-202725 | 10/2013 |
| JP | 2014-5926 | 1/2014 |
| WO | WO 95/33148 A1 | 12/1995 |
| WO | WO 01/32367 A1 | 5/2001 |
| WO | WO 2015/076201 A1 | 5/2015 |

OTHER PUBLICATIONS

Extended European Search Report dated Mar. 15, 2019 in corresponding European Patent Application No. 16835165.8 (6 pages).
International Search Report dated Oct. 11, 2016 in corresponding International Patent Application No. PCT/JP2016/073375.
Chinese Office Action dated Jun. 13, 2019 in corresponding Chinese Patent Application No. 201680046938.4.

* cited by examiner

WORK MACHINE PROVIDED WITH PARALLEL LINK MECHANISM

CROSS REFERENCE TO THE RELATED APPLICATIONS

This application is a U.S. national stage application, which claims the benefit under 35 USC § 371 of PCT International Patent Application No. PCT/JP2016/073375, filed Aug. 9, 2016, which claims foreign priority benefit under 35 USC § 119 of Japanese patent application No. 2015-158208, filed Aug. 10, 2015, the entire disclosures of which is herein incorporated by reference.

BACKGROUND OF THE INVENTION (Field of the Invention)

The present invention relates to a work apparatus including a parallel link mechanism to be used in equipment, such as medical equipment and industrial equipment, which requires high-speed, high-accuracy, and wide operating range.

(Description of Related Art)

Parallel link mechanisms and link actuation devices to be used in various types of work apparatuses such as medical equipment and industrial equipment are proposed in Patent Documents 1, 2, and 3.

RELATED DOCUMENT

Patent Document

[Patent Document 1] JP Laid-open Patent Publication No. 2000-94245
[Patent Document 2] U.S. Pat. No. 5,893,296
[Patent Document 3] JP Laid-open Patent Publication No. 2014-5926

SUMMARY OF THE INVENTION

Regarding the parallel link mechanism of Patent Document 1, the configuration thereof is comparatively simple, and the operating angle of each link is small. Thus, there is a problem in that if the operating range of a travelling plate is set to be large, the link length is increased, thus resulting in large dimensions of the entire mechanism, which leads to an increase in the size of the apparatus. There is also a problem in that the rigidity of the entire mechanism is low, and thus the weight of a tool to be mounted on the travelling plate, that is, the weight capacity of the travelling plate, is limited to a small value.

The link actuation device of Patent Document 2 or Patent Document 3 uses a parallel link mechanism that is configured such that a distal end side link hub is coupled to a proximal end side link hub via three or more quadric chain link mechanisms such that the position of the distal end side link hub relative to the proximal end side link hub can be changed. Accordingly, the link actuation device is compact in size but can operate at high speed with high accuracy in a wide operating range. However, the link actuation device of Patent Document 2 or 3 has a problem in that when the link actuation device is used in combination with another mechanism, the size of the entire apparatus is increased.

An object of the present invention is to provide a work apparatus that includes a parallel link mechanism, that can perform various types of work, such as work to be performed by moving a working body in two mutually orthogonal axial directions with the working body maintained in the same position relative to a work object and work to be performed with the working body angled relative to the work object, at high speed with high accuracy and that can achieve downsizing and cost reduction.

A work apparatus provided with a parallel link mechanism according to the present invention is a work apparatus for performing work on a work object with a working body in a contact manner or in a non-contact manner, the work apparatus comprising: a parallel link mechanism supporting the work object in a position-changeable fashion; a position control actuator configured to operate the parallel link mechanism; a linear motion mechanism configured to move the working body in one axial direction relative to the parallel link mechanism; and a rotating mechanism configured to rotate the work object.

The parallel link mechanism includes three or more link mechanisms coupling a distal end side link hub to a proximal end side link hub such that a position of the distal end side link hub can be changed relative to the proximal end side link hub, in which each of the link mechanisms includes a proximal side end link member pivotably coupled at one end thereof to the proximal end side link hub via a first revolute pair, a distal side end link member pivotably coupled at one end thereof to the distal end side link hub via a second revolute pair, and an intermediate link member with its opposite ends pivotably coupled to the other end of the proximal side end link member via a third revolute pair and to the other end of the distal side end link member via a fourth revolute pair, respectively, and each of the link mechanisms is disposed such that a central axis of the first revolute pair and a central axis of the third revolute pair intersect each other at a proximal end side spherical link center, and a central axis of the second revolute pair and a central axis of the fourth revolute pair intersect each other at a distal end side spherical link center.

The position control actuator is provided in each of two or more link mechanisms of the three or more link mechanisms such that the position of the distal end side link hub relative to the proximal end side link hub is arbitrarily changed.

The linear motion mechanism is configured to move the working body in an axial direction orthogonal to a proximal end side link hub central axis that is defined as a straight line that passes through the proximal end side spherical link center and intersects the central axis of the first revolute pair at a right angle.

The rotating mechanism is mounted on the distal end side link hub and is configured to rotate the work object about a rotation center axis which is parallel to a movement direction of the linear motion mechanism in a state where the proximal end side link hub central axis and a distal end side link hub central axis that is defined as a straight line that passes through the distal end side spherical link center and intersects the central axis of the second revolute pair at a right angle are on the same line.

According to this configuration, since the parallel link mechanism, the linear motion mechanism, and the rotating mechanism configured to rotate the work object about the rotation center axis parallel to the movement direction of the linear motion mechanism are provided, the mere provision of the one-axis linear motion mechanism allows the working body to be moved in two mutually orthogonal axial directions with the working body maintained in the same position relative to the work object, so that downsizing and cost reduction of the work apparatus can be achieved. In addition, work with the working body angled relative to the work object can be achieved when the distal end side link hub of the parallel link mechanism is tilted without moving the rotating mechanism. As described above, various types of work can be performed at high speed with high accuracy while downsizing and cost reduction are achieved. Hereinafter, a specific description will be given.

In the parallel link mechanism, the proximal end side link hub, the distal end side link hub, and the three or more link mechanisms form a two-degrees-of-freedom mechanism in which the distal end side link hub is rotatable about two mutually orthogonal axes relative to the proximal end side link hub. The two-degrees-of-freedom mechanism is compact in size, but can achieve a wide range of movement of the distal end side link hub. For example, the maximum value of a bending angle between a central axis of the proximal end side link hub and a central axis of the distal end side link hub is about ±90°, and an pivot angle of the distal end side link hub relative to the proximal end side link hub can be set in the range of 0° to 360°.

The work apparatus including the parallel link mechanism is configured with two degrees of freedom for the parallel link mechanism, one degree of freedom for the linear motion mechanism, and one degree of freedom for the rotating mechanism, that is with four degrees of freedom in total. With the configuration with four degrees of freedom, the work described below can be performed by combining: operation of operating the parallel link mechanism by the position control actuator to change the position of the work object mounted on the distal end side link hub; operation of moving the working body in the axial direction orthogonal to the central axis of the proximal end side link hub by the linear motion mechanism; and operation of rotating the work object about the rotation center axis by the rotating mechanism.

As one type of work, it is possible to perform non-contact work on the work object with the working body while moving the working body relative to the work object parallel along an X-Y plane orthogonal to the central axis of the proximal end side link hub. For example, in the case of moving the work object parallel to an X-axis direction that is the movement direction of the linear motion mechanism, the working body is moved by the linear motion mechanism with the position of the work object maintained constant by stopping the parallel link mechanism and the rotating mechanism.

In the case of moving the work object parallel to a Y-axis direction orthogonal to an X axis, the linear motion mechanism is stopped, and change of the tilt in the Y-axis direction of the work object associated with operation of the parallel link mechanism is corrected by rotating the work object by the rotating mechanism while operating the parallel link mechanism to move the work object in the Y-axis direction. The rotating mechanism is configured to rotate the work object about the rotation center axis, which is parallel to the movement direction of the linear motion mechanism, in a state where the central axis of the proximal end side link hub and the central axis of the distal end side link hub are on the same line. Thus, when the parallel link mechanism is operated to move the work object in the Y-axis direction, the direction of the rotation center axis is maintained to be the X-axis direction. Accordingly, it is possible to correct the tilt in the Y-axis direction of the work object by rotating the work object by the rotating mechanism.

In the case of moving the work object parallel to the X-Y plane in a direction other than the X-axis direction and the Y-axis direction, the parallel movement can be achieved, with the tilt of the work object maintained, by combining operation to be performed in moving the work object parallel to the X-axis direction and operation to be performed in moving the work object parallel to the Y-axis direction.

As other work, work can be performed on various surfaces of the work object. For example, work can be performed on the work object with the working body angled relative to the work object, by operating the parallel link mechanism to tilt the distal end side link hub relative to the proximal end side link hub without operating the rotating mechanism. In addition, work can be performed while the surface of the work object that faces the working body side is being changed, by rotating the work object by the rotating mechanism without operating the parallel link mechanism. It is also possible to perform work by combining angling the work object by the parallel link mechanism and rotating the work object by the rotating mechanism.

In one embodiment of the present invention, the linear motion mechanism may be mounted on a member that forms a part of the proximal end side link hub of the parallel link mechanism. In this case, a member for mounting the linear motion mechanism is shared by the parallel link mechanism, and thus downsizing and cost reduction can be achieved.

In one embodiment of the present invention, in addition to the linear motion mechanism, an additional linear motion mechanism configured to move the working body in a direction parallel to the proximal end side link hub central axis may be provided. When the additional linear motion mechanism is provided, the distance between the working body and the work object in the direction parallel to the proximal end side link hub central axis can be controlled. Thus, work to be performed with the working body brought into contact with the work object or work to be performed in a non-contact manner with the distance between the working body and the work object maintained constant, is possible.

In one embodiment of the present invention, the parallel link mechanism may be mounted such that the distal end side link hub is oriented downward, and the working body may be disposed in an internal space of the parallel link mechanism that is a space formed between the proximal end side link hub and the distal end side link hub. With this configuration, the working body and control devices such as the position control actuator for the parallel link mechanism and a motor for the linear motion mechanism are not disposed below the work object. Thus, chips and the like generated from the work object, and grease, paint, and the like adhering to the work object can be prevented from adhering to the working body and the control devices and adversely affecting these components. In addition, since the working body is disposed in the internal space, the entire configuration can be made further compact.

In one embodiment of the present invention, a rotating mechanism mounting member fixed to the distal end side link hub may be provided outside an internal space of the parallel link mechanism that is a space formed between the proximal end side link hub and the distal end side link hub, the rotating mechanism may be mounted on the rotating mechanism mounting member, and a work object fixing member that is configured to be rotated by the rotating mechanism and has a tip portion extending into the internal space and configured to fix the work object may be provided. With this configuration, the work object is disposed in the internal space of the parallel link mechanism. Thus, the stroke of the linear motion mechanism can be shortened, and a compact configuration can be achieved. Since the rotating mechanism is disposed outside the internal space of the parallel link mechanism, interference of the rotating mechanism with each link mechanism of the parallel link mechanism is avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A work apparatus provided with a parallel link mechanism according to an embodiment of the present invention will be described with reference to FIGS. 1 to 9.

Figure 1:
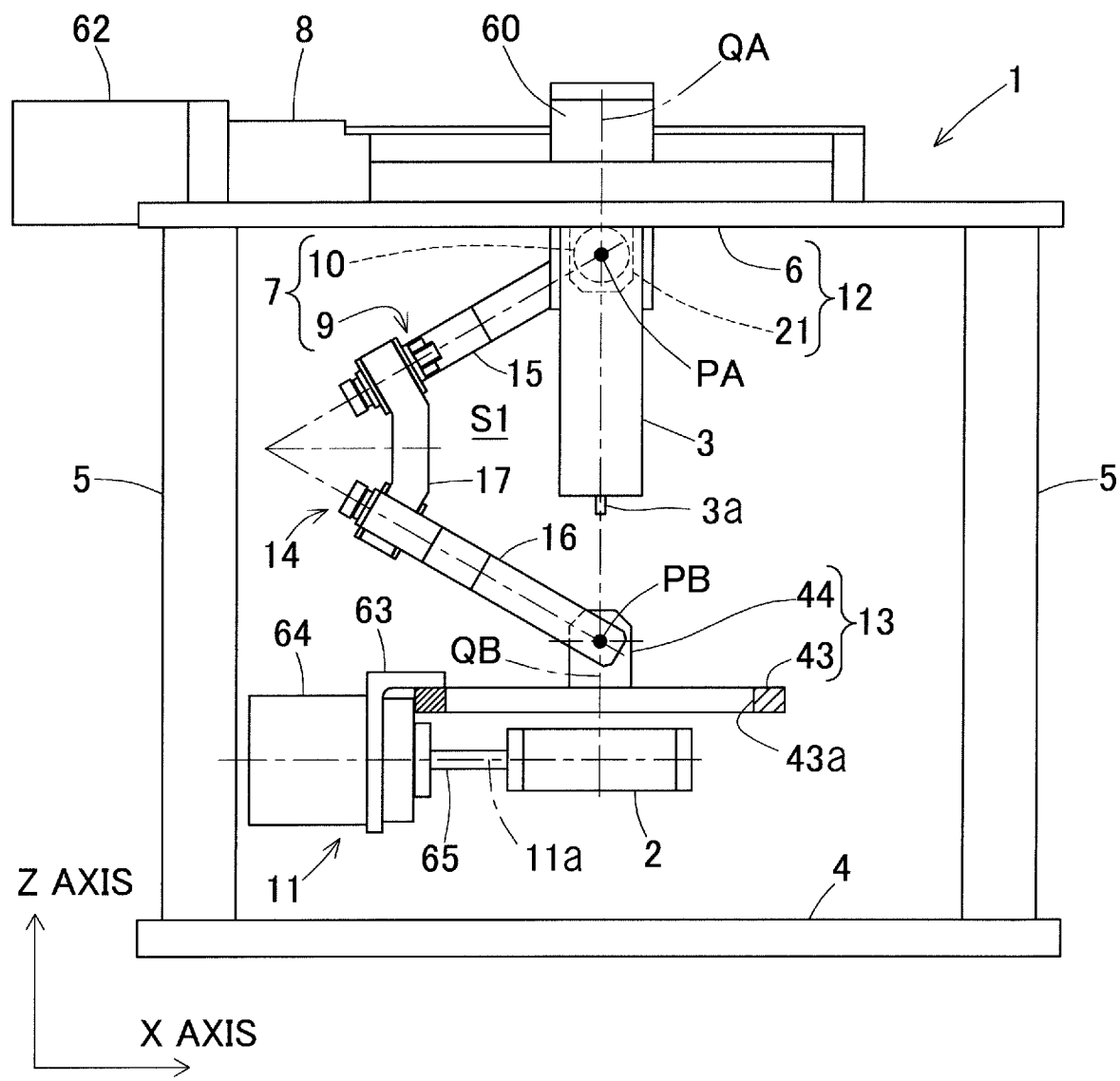
FIG. 1 is a front view of a work apparatus according to an embodiment of the present invention.
Figure 2:
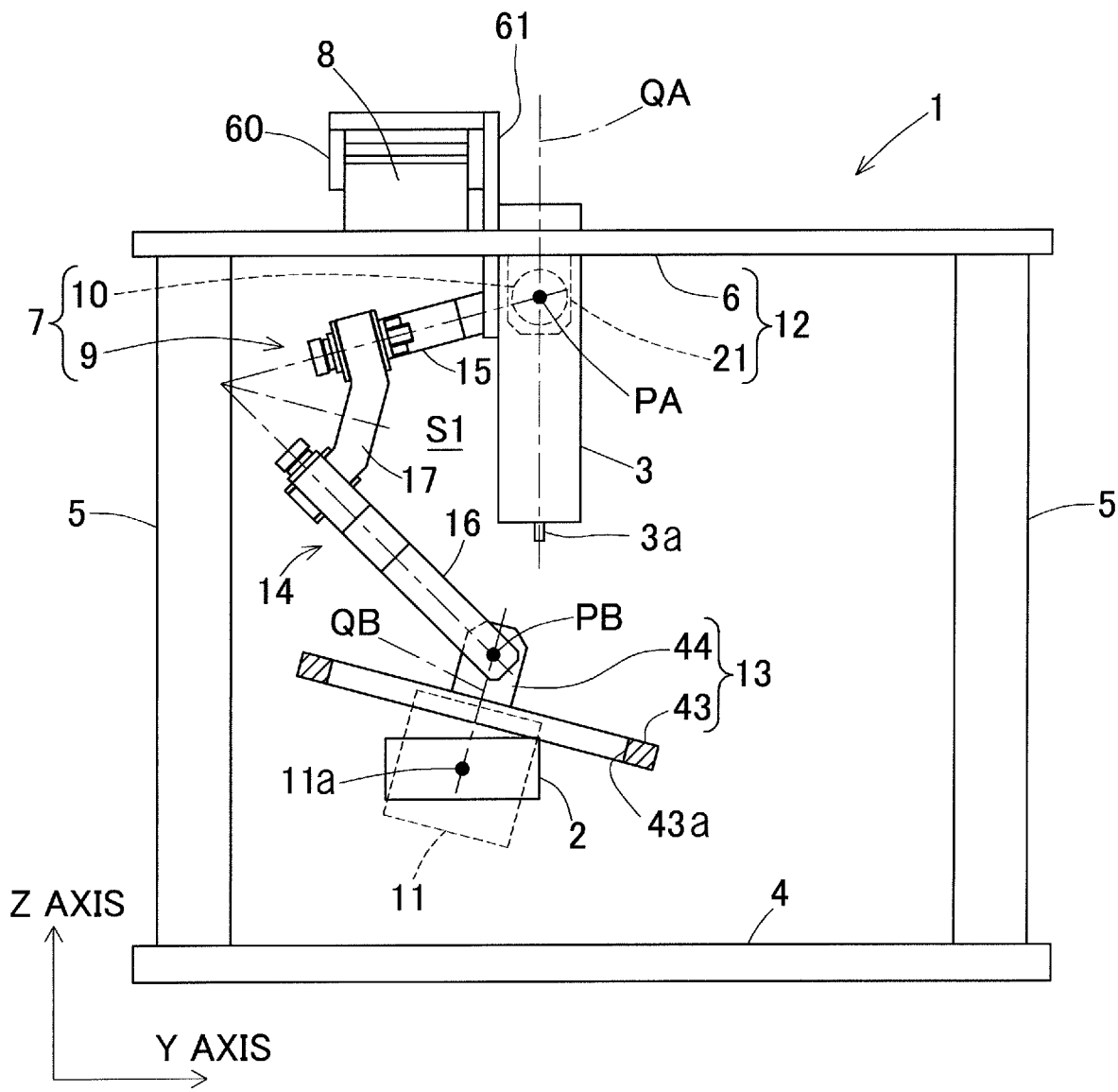
FIG. 2 is a side view of the work apparatus.

FIG. 1 is a front view of a work apparatus 1 of the present embodiment, and FIG. 2 is a side view of the work apparatus 1. The work apparatus 1 is an apparatus that performs non-contact operation on a work object 2 with a working body 3. A horizontal proximal end member 6 is supported by a plurality of posts 5 that are provided on a base plate 4 so as to project therefrom. A link actuation device 7 and an X-axis linear motion mechanism 8 are mounted on the proximal end member 6. To be exact, the proximal end member 6 forms a part of the link actuation device 7.

The link actuation device 7 includes: a parallel link mechanism 9 that supports a rotating mechanism 11 and a work object 2 in a position-changeable fashion; and position control actuators 10 that operate the parallel link mechanism 9. The X-axis linear motion mechanism 8 is a mechanism that moves the working body 3 in an X-axis direction relative to the work object 2. The X-axis linear motion mechanism 8 is an example of a "linear motion mechanism" recited in the claims. The rotating mechanism 11 is a mechanism that rotates the work object 2 about a rotation center axis 11a.

Figure 3:
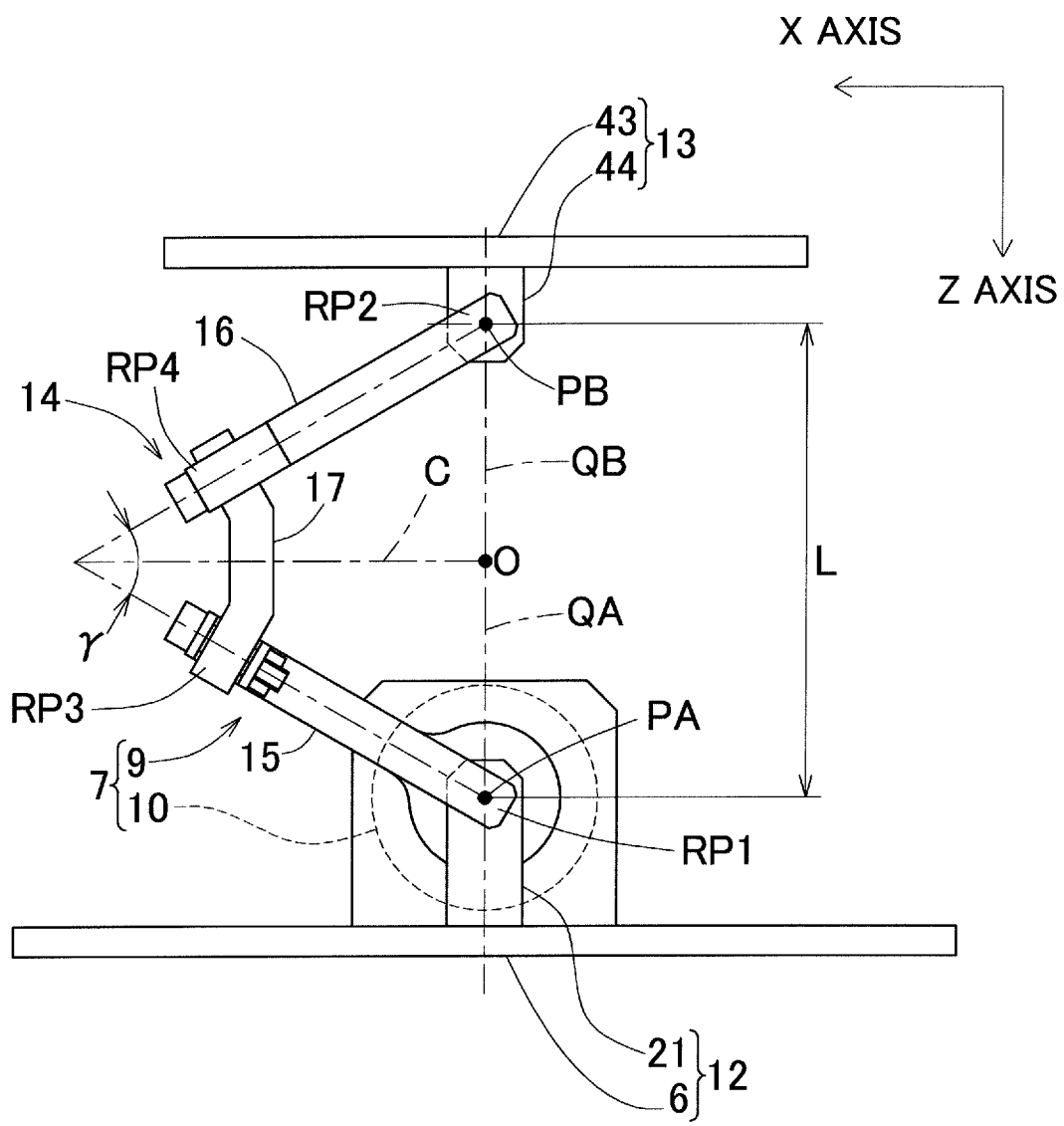
FIG. 3 is a front view of a link actuation device of the work apparatus, wherein a part thereof is omitted.
Figure 4:
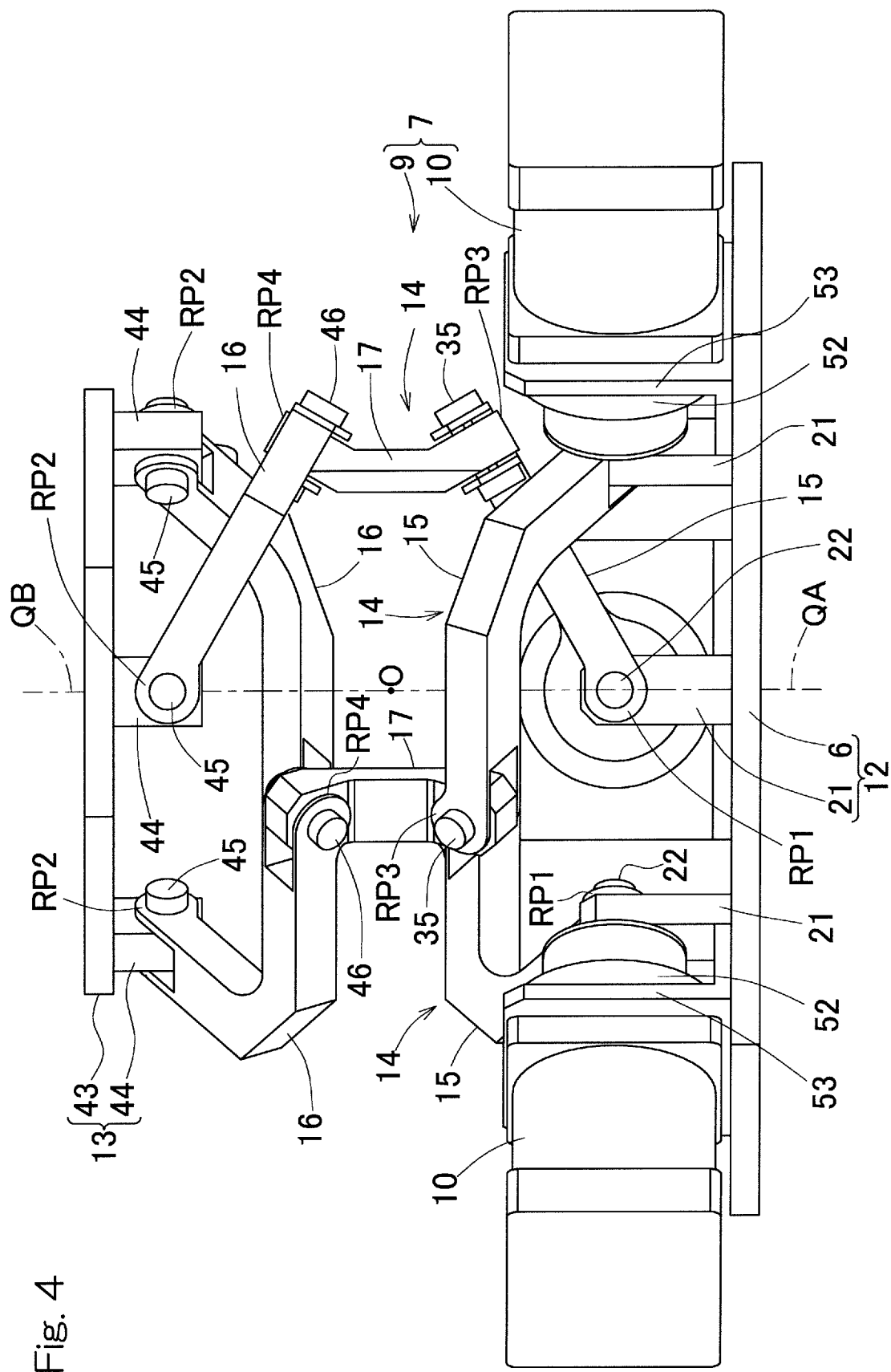
FIG. 4 is a perspective view of a state of the link actuation device.
Figure 5:
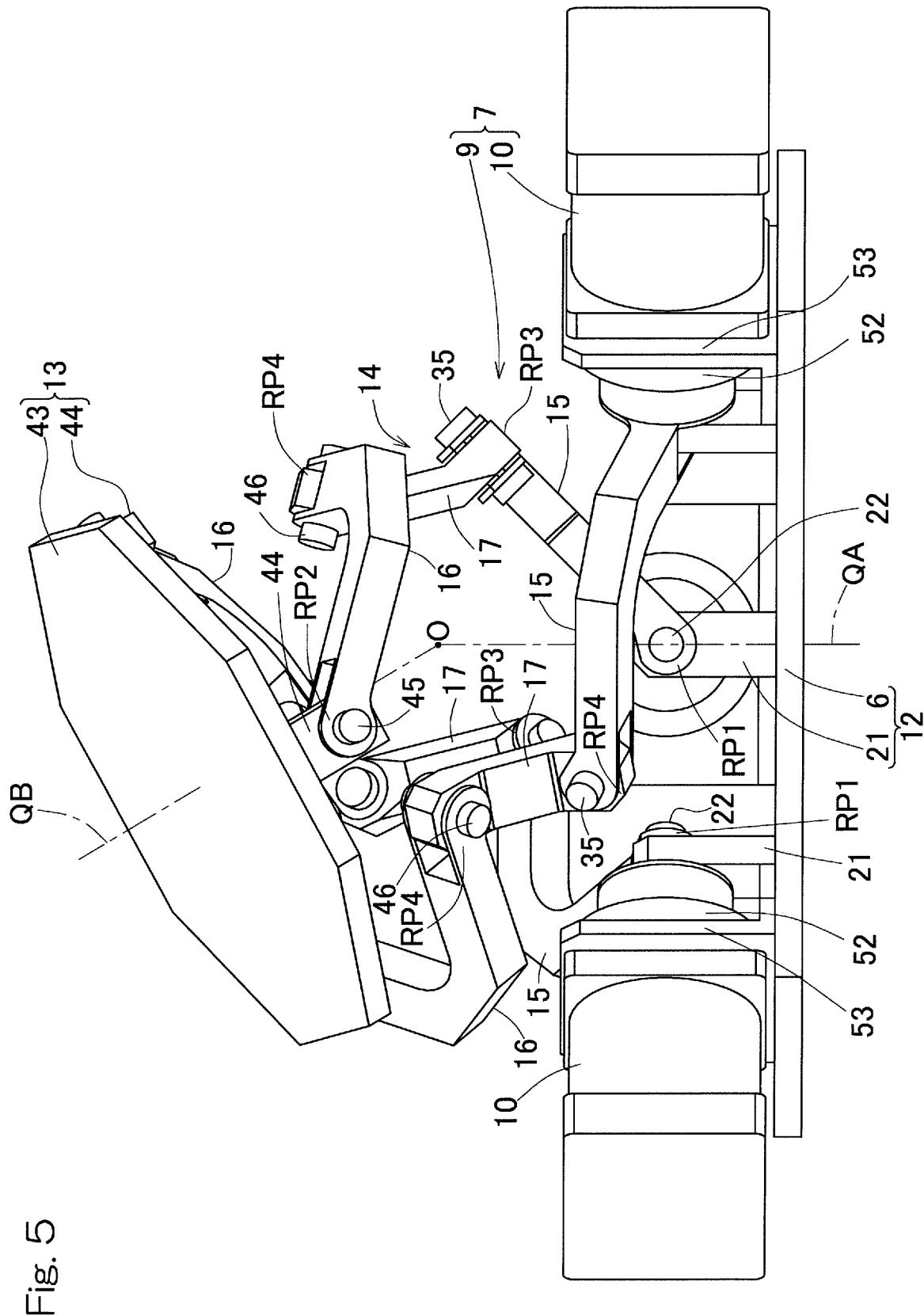
FIG. 5 is a perspective view of a different state of the link actuation device.

FIG. 3 is a front view of the link actuation device 7, and FIG. 4 and FIG. 5 are perspective views showing different states of the link actuation device 7. In these diagrams, the upper and lower sides are inverted with respect to FIG. 1 and FIG. 2. The parallel link mechanism 9 of the link actuation device 7 includes three link mechanisms 14 that couple a distal end side link hub 13 to a proximal end side link hub 12 such that the position of the distal end side link hub 13 can be changed relative to the proximal end side link hub 12. In a state where the parallel link mechanism 9 is installed as shown in FIG. 1 and FIG. 2, the distal end side link hub 13 is oriented downward. In FIG. 3, only one link mechanism 14 is shown. The number of link mechanisms 14 may be four or more.

Each link mechanism 14 includes a proximal side end link member 15, a distal side end link member 16, and an intermediate link member 17, and forms a quadric chain link mechanism including four revolute pairs. The proximal side end link member 15 and the distal side end link member 16 each have an L shape. The proximal side end link member 15 is pivotably coupled at one end thereof to the proximal end side link hub 12 via a first revolute pair RP1. The distal side end link member 16 is pivotably coupled at one end thereof to the distal end side link hub 13 via a second revolute pair RP2. The intermediate link member 17 has opposite ends to which the other end of the proximal side end link member 15 and the other end of the distal side end link member 16 are pivotably coupled via a third revolute pair RP3 and a fourth revolute pair RP4, respectively.

Figure 6A:
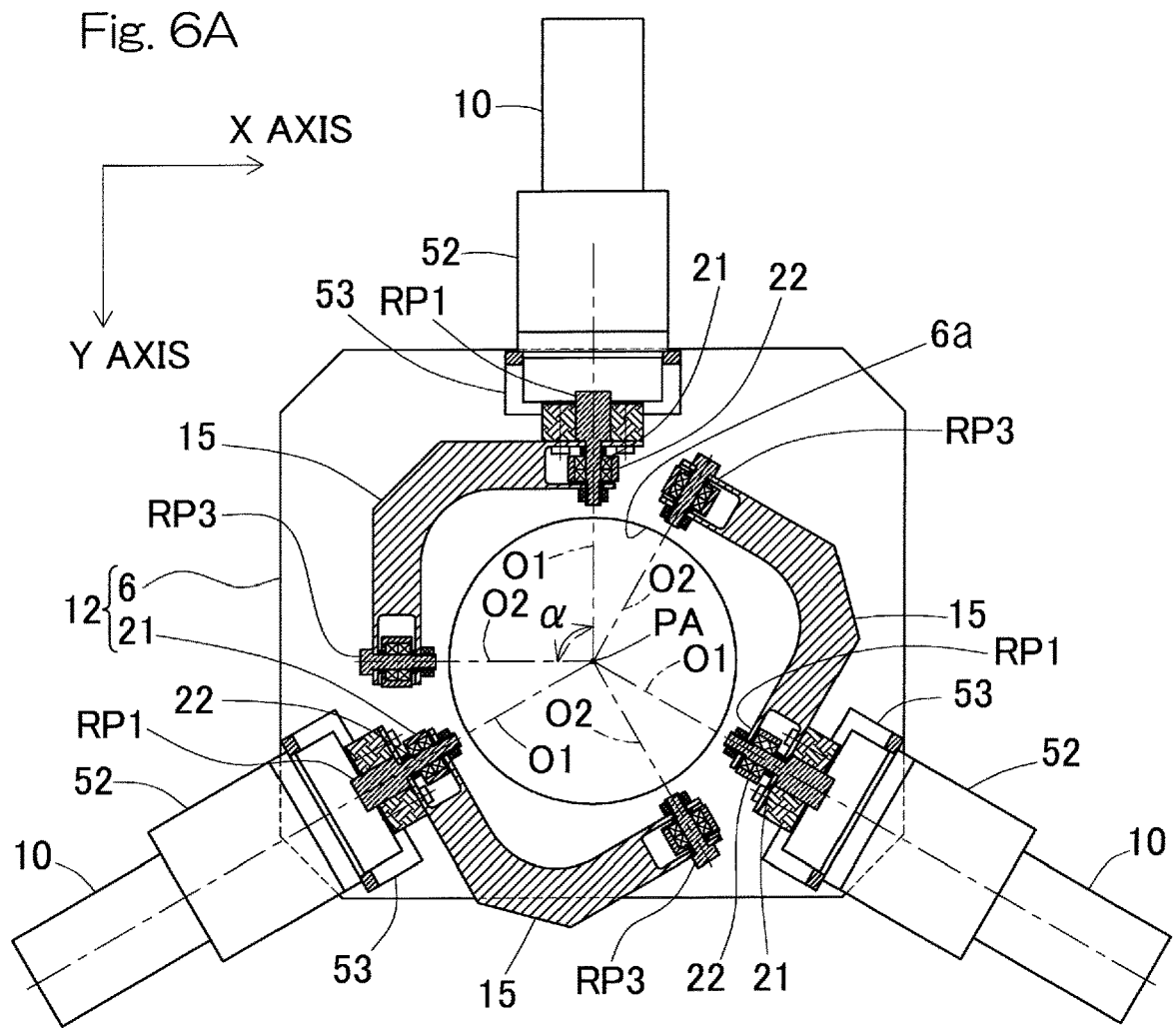
FIG. 6A is a cross-sectional view of a proximal end side link hub, proximal side end link members, etc. of the link actuation device.

The parallel link mechanism 9 is formed by combining two spherical link mechanisms. As shown in FIG. 6A, each link mechanism 14 is disposed such that: central axes O1 of the three first revolute pairs RP1 and central axes O2 of the three third revolute pairs RP3 intersect each other at a common proximal end side spherical link center PA; and central axes O1 of the three second revolute pairs RP2 and central axes O2 of the three fourth revolute pairs RP4 intersect each other at a common distal end side spherical link center PB. In FIG. 6A, only the proximal end side is shown as a representative. At the proximal end side, the distances between the three first revolute pairs RP1 and the proximal end side spherical link center PA are equal to each other. Similarly, at the distal end side, the distances between the three second revolute pairs RP2 and the distal end side spherical link center PB are equal to each other. As shown in FIG. 3, in each link mechanism 14, the central axis of the third revolute pair RP3 and the central axis of the fourth revolute pair RP4 may form a certain intersection angle γ, or may be parallel to each other.

FIG. 6A is a cross-sectional view of the proximal end side link hub 12, the proximal side end link members 15, etc. FIG. 6A shows a relationship between: the central axis O1 of each of the first revolute pairs between the proximal end side link hub 12 and the proximal side end link members 15; and the proximal end side spherical link center PA. The shapes and the positional relationship of the distal end side link hub 13 and the distal side end link members 16 are the same as in FIG. 6A (not shown). In the example in FIG. 6A, the angle α formed by the central axis O1 of each first revolute pair PR1 and the central axis O2 of each third revolute pair RP3 is set at 90°, but may be an angle other than 90°.

Figures 7, 8:
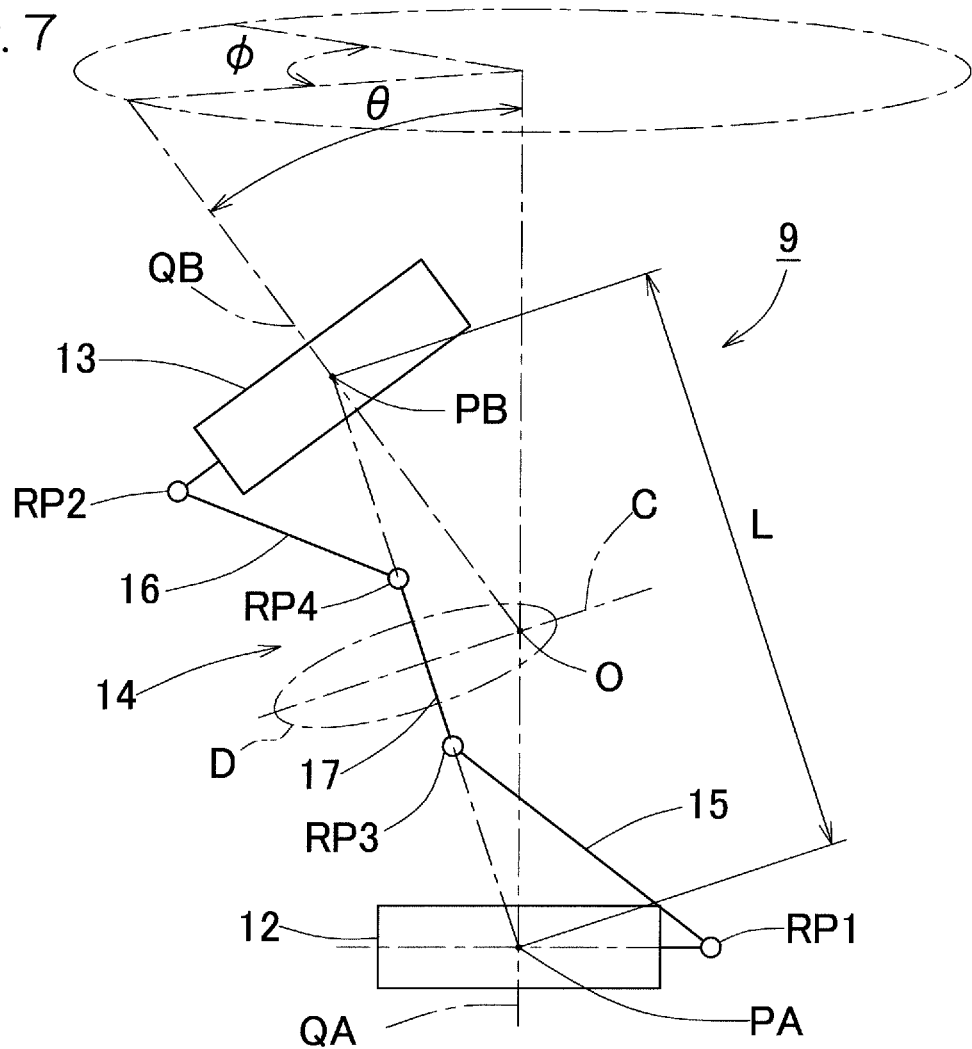
FIG. 7 is a diagram showing a link mechanism of the parallel link mechanism with straight lines.
FIG. 8 is a plan view of an X-axis linear motion mechanism of the work apparatus.

The three link mechanisms 14 have respective configurations geometrically identical with each other. The geometrically identical configuration means that, as shown in FIG. 7, a geometric model depicted with straight lines representing the link members 15, 16, and 17, that is, a model depicted with the respective revolute pairs RP1, RP2, RP3, and RP4 and straight lines connecting these revolute pairs, represents a shape in which the proximal end side portion thereof and the distal end side portion thereof are symmetrical with each other with respect to the center portion of the intermediate link member 17. FIG. 7 is a diagram showing one link mechanism 14 depicted with straight lines. Each parallel link mechanism 9 according to this embodiment is of a rotation symmetrical type, and has a positional configuration in which the positional relationship between the proximal end side link hub 12 and the proximal side end link member 15, and the distal end side link hub 13 and the distal side end link member 16, is in rotation symmetry relative to a center line C of the intermediate link member 17. The center portion of each intermediate link member 17 is located on a common orbital circle D.

The proximal end side link hub 12, the distal end side link hub 13, and the three link mechanisms 14 form a two-degrees-of-freedom mechanism in which the distal end side link hub 13 is rotatable about two mutually orthogonal axes, relative to the proximal end side link hub 12. In other words, the mechanism allows the distal end side link hub 13 to rotate with two degrees of freedom to change its position, relative to the proximal end side link hub 12. This two-degrees-of-freedom mechanism is compact in size, but can achieve a wide range of movement of the distal end side link hub 13 relative to the proximal end side link hub 12.

For example, when straight lines that pass through the spherical link centers PA and PB and that intersect the central axes O1 (FIG. 6A) of the respective revolute pairs between the link hubs 12 and 13 and the end link members 15 and 16 at a right angle are defined as central axes QA and QB of the link hubs 12 and 13, the maximum value of a bending angle θ (FIG. 7) between the central axis QA of the proximal end side link hub 12 and the central axis QB of the distal end side link hub 13 can be about ±90°. In addition, a pivot angle φ (FIG. 7) of the distal end side link hub 13 relative to the proximal end side link hub 12 can be set in the range of 0° to 360°. The bending angle θ is defined as a vertical angle formed when the central axis QB of the distal end side link hub 13 is inclined relative to the central axis QA of the proximal end side link hub 12. The pivot angle φ is defined as a horizontal angle formed when the central axis QB of the distal end side link hub 13 is inclined relative to the central axis QA of the proximal end side link hub 12.

Change of the position of the distal end side link hub 13 relative to the proximal end side link hub 12 is performed with, as a rotation center, the point of intersection O of the central axis QA of the proximal end side link hub 12 and the central axis QB of the distal end side link hub 13. FIG. 4 shows a state where the central axis QA of the proximal end side link hub 12 and the central axis QB of the distal end side link hub 13 are on the same line. FIG. 5 shows a state where the central axis QB of the distal end side link hub 13 forms a certain operating angle relative to the central axis QA of the proximal end side link hub 12. Even when the position is changed, the distance L (FIG. 7) between the proximal and distal end side spherical link centers PA and PB does not change.

In the parallel link mechanism 9, if the angular positional relationships between the intermediate link member 17 and the end link members 15 and 16 with respect to the symmetry plane of the intermediate link member 17 are made identical between the proximal end side and the distal end side when: the angles of the central axes O1 of the revolute pairs RP1 and RP2 between the link hubs 12 and 13 and the end link members 15 and 16 in each link mechanism 14 and the distances from the spherical link centers PA and PB to the revolute pairs RP1 and RP2 between the link hubs 12 and 13 and the end link members 15 and 16 are equal to each other; the central axes O1 of the revolute pairs RP1 and RP2 between the link hubs 12 and 13 and the end link members 15 and 16 of each link mechanism 14 and the central axes O2 of the revolute pairs RP3 and RP4 between the end link members 15 and 16 and the intermediate link member 17 intersect the spherical link centers PA and PB at the proximal end side and the distal end side; the geometrical shapes of the proximal side end link member 15 and the distal side end link member 16 are the same; and the shape of the intermediate link member 17 is the same between the proximal end side and the distal end side, the proximal end side link hub 12 and each proximal side end link member 15, and the distal end side link hub 13 and each distal side end link member 16 move in the same manner due to the geometrical symmetry.

As shown in FIG. 1 to FIG. 6A, the proximal end side link hub 12 includes the proximal end member 6 and three rotary shaft coupling members 21 provided so as to be integrated with the proximal end member 6. The proximal end member 6 is an example of a "member forming a part of a proximal end side link hub" recited in the claims. The proximal end member 6 has a circular through hole 6a (FIG. 6A) in a center portion thereof, and the three rotary shaft coupling members 21 are arranged around the through hole 6a at regular intervals in the circumferential direction. The center of the through hole 6a is located on the proximal end side link hub central axis QA. A rotary shaft 22 is rotatably coupled to each rotary shaft coupling member 21 so as to have an axis that intersects the proximal end side link hub central axis QA. The proximal side end link member 15 is coupled at one end thereof to the rotary shaft 22.

Figure 6B:
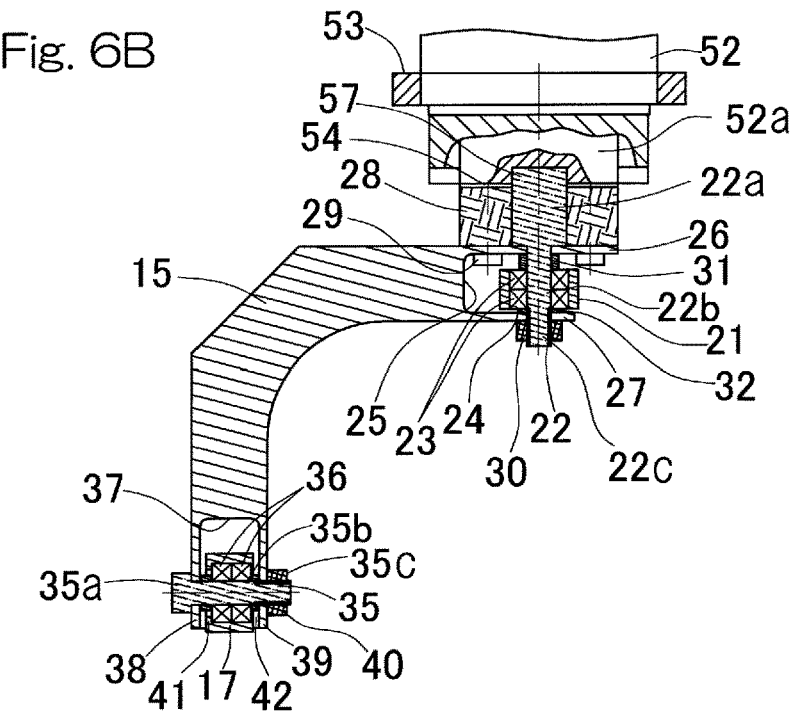
FIG. 6B is a partially enlarged view of FIG. 6A.

As shown in FIG. 6B in which one proximal side end link member 15 and the areas surrounding both ends thereof are shown in an enlarged manner, the rotary shaft 22 has a large-diameter portion 22a, a small-diameter portion 22b, and a male thread portion 22c, and is rotatably supported at the small-diameter portion 22b by the rotary shaft coupling member 21 via two bearings 23. Each bearing 23 may be, for example, a ball bearing such as a deep groove ball bearing, an angular contact ball bearing, or the like. These bearings 23 are mounted in an inner-diameter groove 24 provided in the rotary shaft coupling member 21, in a state of being fitted therein, and are fixed by a method such as press-fit, adhesion, and crimping. The same applies to the type of and a mounting method for bearings provided to the other revolute pair sections.

The rotary shaft 22 is coaxially arranged at the large-diameter portion 22a thereof on an output shaft 52a of a later-described speed reduction mechanism 52. The arrangement thereof will be described later. In addition, the proximal side end link member 15 is coupled at one end thereof to the rotary shaft 22 so as to be pivotable integrally with the rotary shaft 22. Specifically, the rotary shaft coupling member 21 is disposed within a cut portion 25 formed at the one end of the proximal side end link member 15, and the small-diameter portion 22b of the rotary shaft 22 is inserted in the inner rings of the bearings 23 and through holes formed in a pair of outer and inner rotary shaft support portions 26 and 27 that are both side potions of the cut portion 25 at the one end of the proximal side end link member 15. The proximal side end link member 15 and the output shaft 52a of the speed reduction mechanism 52 are fixed to each other by bolts 29 via a spacer 28 fitted to the outer periphery of the large-diameter portion 22a of the rotary shaft 22, and a nut 30 is screwed to the male thread portion 22c of the rotary shaft 22 that projects from the outer rotary shaft support portion 27. Spacers 31 and 32 are interposed between the inner rings of the bearings 23 and the pair of rotary shaft support portions 26 and 27, respectively, so that a preload can be applied to the bearings 23 in screwing the nut 30.

A rotary shaft 35 is rotatably coupled to one end of the intermediate link member 17 and is coupled to the other end of the proximal side end link member 15. Similar to the rotary shaft 22 at the proximal end side link hub 12, the rotary shaft 35 at the intermediate link member 17 has a large-diameter portion 35a, a small-diameter portion 35b, and a male thread portion 35c, and is rotatably supported at the small-diameter portion 35b by the one end of the intermediate link member 17 via two bearings 36. Specifically, the one end of the intermediate link member 17 is disposed within a cut portion 37 formed at the other end of the proximal side end link member 15, and the small-diameter portion 35b of the rotary shaft 35 is inserted in the inner rings of the bearings 36 and through holes formed in a pair of outer and inner rotary shaft support portions 38 and 39 that are both side potions of the cut portion 37 at the other end of the proximal side end link member 15. A nut 40 is screwed to the male thread portion 35c of the rotary shaft 35 that projects from the outer rotary shaft support portion 39. Spacers 41 and 42 are interposed between the inner rings of the bearings 36 and the pair of rotary shaft support portions 38 and 39, respectively, so that a preload can be applied to the bearings 36 in screwing the nut 40.

As shown in FIGS. 1 to 5, the distal end side link hub 13 includes a flat plate-shaped distal end member 43 having a circular through hole 43a in a center portion thereof, and three rotary shaft coupling members 44 provided around the through hole 43a of the distal end member 43 equidistantly in the circumferential direction. The center of the through hole 43a is located on the central axis QB of the distal end side link hub 13. A rotary shaft 45 is rotatably coupled to each rotary shaft coupling member 44 so as to have an axis that intersects the central axis QB of the distal end side link hub 13. The distal side end link member 16 is coupled at one end thereof to the rotary shaft 45 at the distal end side link hub 13. A rotary shaft 46 is rotatably coupled to the other end of the intermediate link member 17 and is coupled to the other end of the distal side end link member 16. The rotary shaft 45 at the distal end side link hub 13 and the rotary shaft 46 at the intermediate link member 17 also have the same shape as the rotary shaft 35 and are rotatably coupled to the rotary shaft coupling member 44 and the other end of the intermediate link member 17, respectively, via two bearings (not shown).

Each position control actuator 10 of the link actuation device 7 is in the form of a rotary actuator provided with the speed reduction mechanism 52, and is mounted on the upper surface of the proximal end member 6 of the proximal end side link hub 12 so as to be coaxial with the rotary shaft 22. The position control actuator 10 and the speed reduction mechanism 52 are provided integrally with each other, and the speed reduction mechanism 52 is fixed to the proximal end member 6 by a motor fixing member 53. In this example, all of the three link mechanisms 14 are provided with respective position control actuators 10. However, when at least two of the three link mechanisms 14 are provided with the position control actuators 10, the position of the distal end side link hub 13 relative to the proximal end side link hub 12 can be determined.

The speed reduction mechanism 52 shown in FIG. 6B is of a flange output type and has the large-diameter output shaft 52a. The free end surface of the output shaft 52a forms a flat flange surface 54 orthogonal to the center line of the output shaft 52a. The output shaft 52a is connected to the rotary shaft support portion 26 of the proximal side end link member 15 via the spacer 23 by the bolts 29. The large-diameter portion 22a of the rotary shaft 22 at the first revolute pair RP1 between the proximal end side link hub 12 and the proximal side end link member 15 is fitted into an inner-diameter groove 57 provided in the output shaft 52a of the speed reduction mechanism 52.

As shown in FIG. 1, FIG. 2, and FIG. 8, the X-axis linear motion mechanism 8 has an X-axis stage 60 that is mounted on the proximal end member 6 and that is movable in the X-axis direction. The working body 3 is fixed to the X-axis stage 60 via a working body fixing member 61 in a suspended position. A drive source that moves the X-axis stage 60 is a motor 62. The working body 3 fixed to the X-axis stage 60 moves in the X-axis direction by driving the motor 62.

The working body 3 is configured to perform work on the work object 2 in a non-contact manner. The working body 3 may be, for example, a grease coating machine, a laser inspection machine, a spray type coating machine, a welding machine, or the like. The working body 3 is fixed to the X-axis stage 60 such that a working portion 3a such as a grease nozzle is oriented downward. The working portion 3a is located in an internal space S1 of the parallel link mechanism 9 that is a space formed between the proximal end side link hub 12 and the distal end side link hub 13.

As shown in FIG. 1 and FIG. 2, the rotating mechanism 11 includes a motor 64 that is mounted on a distal end member 43 of the distal end side link hub 13 via a rotating mechanism mounting member 63. A work object fixing member 65 is mounted on an output shaft of the motor 64. The work object 2 is fixed to the work object fixing member 65. A central portion of the work object 2 fixed to the work object fixing member 65 is located near the central axis QB of the distal end side link hub 13. The work object 2 rotates about the rotation center axis 11a by rotating the motor 64. When the central axis QA of the proximal end side link hub 12 and the central axis QB of the distal end side link hub 13 are on the same line (the state shown in FIG. 4), the rotation center axis 11a is parallel to the X-axis direction, that is, the movement direction of the X-axis linear motion mechanism 8. In the shown example, the work object 2 has a rectangular parallelepiped shape.

The work apparatus 1 using the parallel link mechanism is configured with two degrees of freedom for the parallel link mechanism 9, one degree of freedom for the X-axis linear motion mechanism 8, and one degree of freedom for the rotating mechanism 11, that is, with four degrees of freedom in total. With the configuration with four degrees of freedom, various types of work can be performed on the work object 2 with the working body 3 by: operating the parallel link mechanism 9 by the position control actuators 10 to change the position of the work object 2; and moving the working body 3 in the X-axis direction by the X-axis linear motion mechanism 8 and rotating the work object 2 about the rotation center axis 11a by the rotating mechanism 11. Change of the position of the work object 2 can be performed at high speed with high accuracy by the parallel link mechanism 9, and thus it is possible to perform work at a high speed with high accuracy.

Specifically, the following work can be performed by the work apparatus 1. As one type of work, it is possible to perform non-contact work on the work object 2 with the working body 3 while moving the work object 2 parallel to an X-Y plane which is orthogonal to the central axis QA of the proximal end side link hub 12.

Figure 9A:
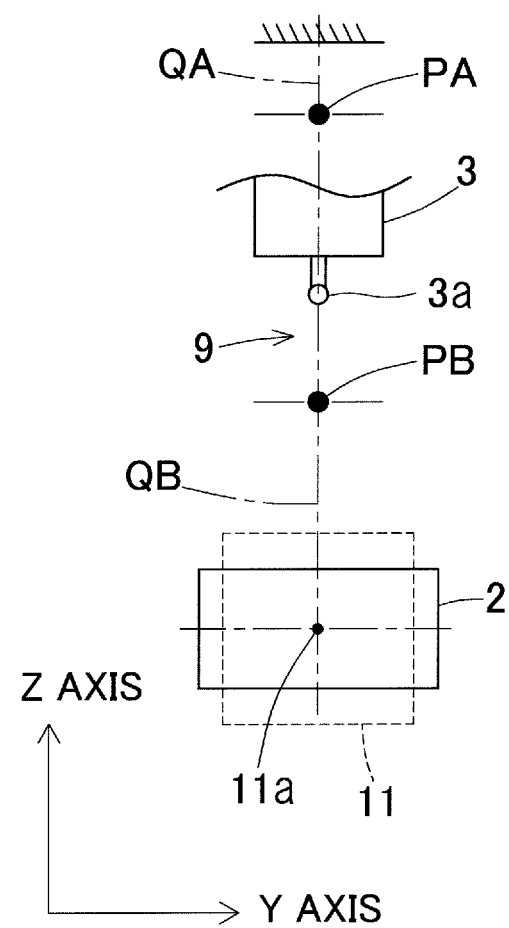
FIG. 9A is an explanatory diagram showing a state of work operation of the work apparatus.

For example, in the case of moving the work object 2 parallel to the X-axis direction that is the movement direction of the X-axis linear motion mechanism 8, the working body 3 is moved by the X-axis linear motion mechanism 8 (not shown) while the position of the work object 2 is maintained constant by stopping the parallel link mechanism 9 and the rotating mechanism 11, as shown in FIG. 9A.

Figure 9B:
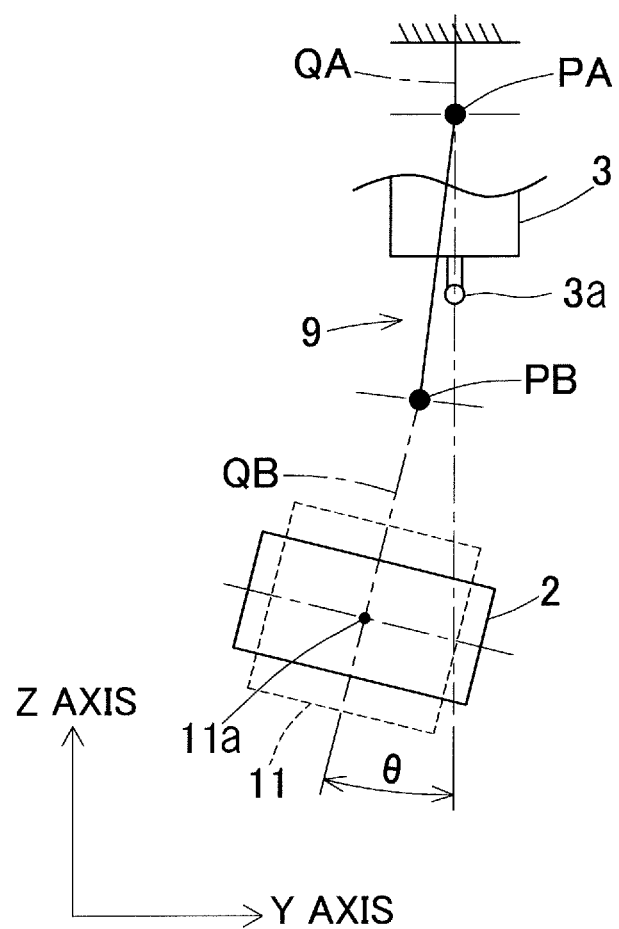
FIG. 9B is an explanatory diagram showing another state of the work operation of the work apparatus.
Figure 9C:
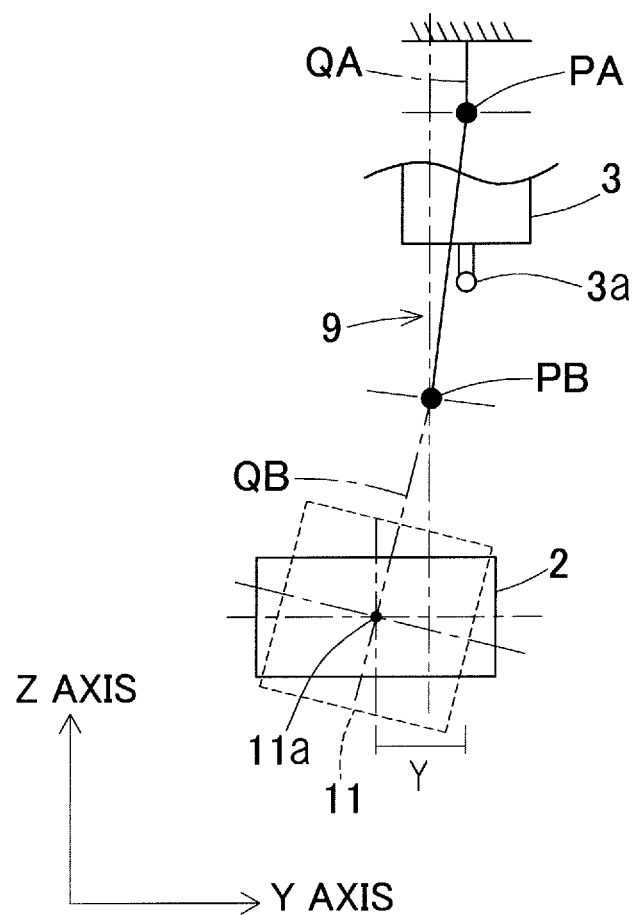
FIG. 9C is an explanatory diagram showing still another state of the work operation of the work apparatus.

In the case of moving the work object 2 parallel to a Y-axis direction orthogonal to the X axis, the X-axis linear motion mechanism 8 is stopped, and change of the tilt in the Y-axis direction of the work object 2 associated with operation of the parallel link mechanism 9 is corrected by rotating the work object 2 by the rotating mechanism 11 as shown in FIG. 9C while operating the parallel link mechanism 9 to move the work object 2 in the Y-axis direction as shown in FIG. 9B. In the shown example, the work object 2 is moved in the Y-axis direction for a distance Y by tilting the central axis QB of the distal end side link hub relative to the central axis QA of the proximal end side link hub by an angle (bending angle) θ. The rotating mechanism 11 is configured to rotate the work object 2 about the rotation center axis 11a, which is parallel to the movement direction of the X-axis linear motion mechanism 8, in a state where the central axis QA of the proximal end side link hub 12 and the central axis QB of the distal end side link hub 13 are on the same line. Therefore, when the parallel link mechanism 9 is operated to move the work object 2 in the Y-axis direction, the direction of the rotation center axis 11a is maintained to be the X-axis direction. Accordingly, it is possible to correct the tilt in the Y-axis direction of the work object 2 by rotating the work object 2 by the rotating mechanism 11.

In the case of performing work on the work object 2 with the working body 3 angled relative to the work object 2 as will be described later, the tilt correction by the rotating mechanism 11 is not necessary.

In the case of moving the work object 2 parallel to the X-Y plane in a direction other than the X-axis direction and the Y-axis direction, the parallel movement can be achieved with the tilt of the work object 2 maintained, by combining operation to be performed in moving the work object 2 parallel to the X-axis direction and operation to be performed in moving the work object 2 parallel to the Y-axis direction.

As an example of other work, work can be performed on various surfaces of the work object 2.

For example, work can be performed on the work object 2 with the working body 3 angled relative to the work object 2, by operating the parallel link mechanism 9 to tilt the distal end side link hub 13 relative to the proximal end side link hub 12 without operating the rotating mechanism 11.

As still other work, work can be performed while the surface of the work object 2 that faces the working body 3 side is being changed, by rotating the work object 2 by the rotating mechanism 11 without operating the parallel link mechanism 9. It is also possible to perform work by combining angling the work object 2 by the parallel link mechanism 9 and rotating the work object 2 by the rotating mechanism 11.

It is possible to perform non-contact work while moving the work object 2 along the X-Y plane without providing a linear motion mechanism in the Y-axis direction, by moving the work object 2 in the X-axis direction by the X-axis linear motion mechanism 8 and moving the work object 2 in the Y-axis direction by the parallel link mechanism 9 as described above. Accordingly, downsizing and cost reduction can be achieved. In addition, since the rotating mechanism 11 is provided, the work object 2 can be moved parallel to the X-Y plane, so that the types of work are diversified.

In the case of this embodiment, the parallel link mechanism 9 is mounted such that the distal end side link hub 13 is oriented downward, and the working body 3 is disposed in the internal space S1 of the parallel link mechanism 9. In other words, the working body 3 and control devices such as the position control actuators 10 for the parallel link mechanism 9 and the motor 62 for the X-axis linear motion mechanism 8 are not disposed below the work object 2. Thus, chips and the like generated from the work object 2, and grease, paint, and the like adhering to the work object 2 can be prevented from adhering to the working body 3 and the control devices and adversely affecting these components. In addition, since the working body 3 is disposed in the internal space S1, the entire configuration can be made further compact.

Since the X-axis linear motion mechanism 8 is mounted on the proximal end member 6 that is a member forming a part of the proximal end side link hub 12 of the parallel link mechanism 9, a member for mounting the X-axis linear motion mechanism 8 is shared by the parallel link mechanism 9, so that downsizing and cost reduction can be achieved.

Figure 10:
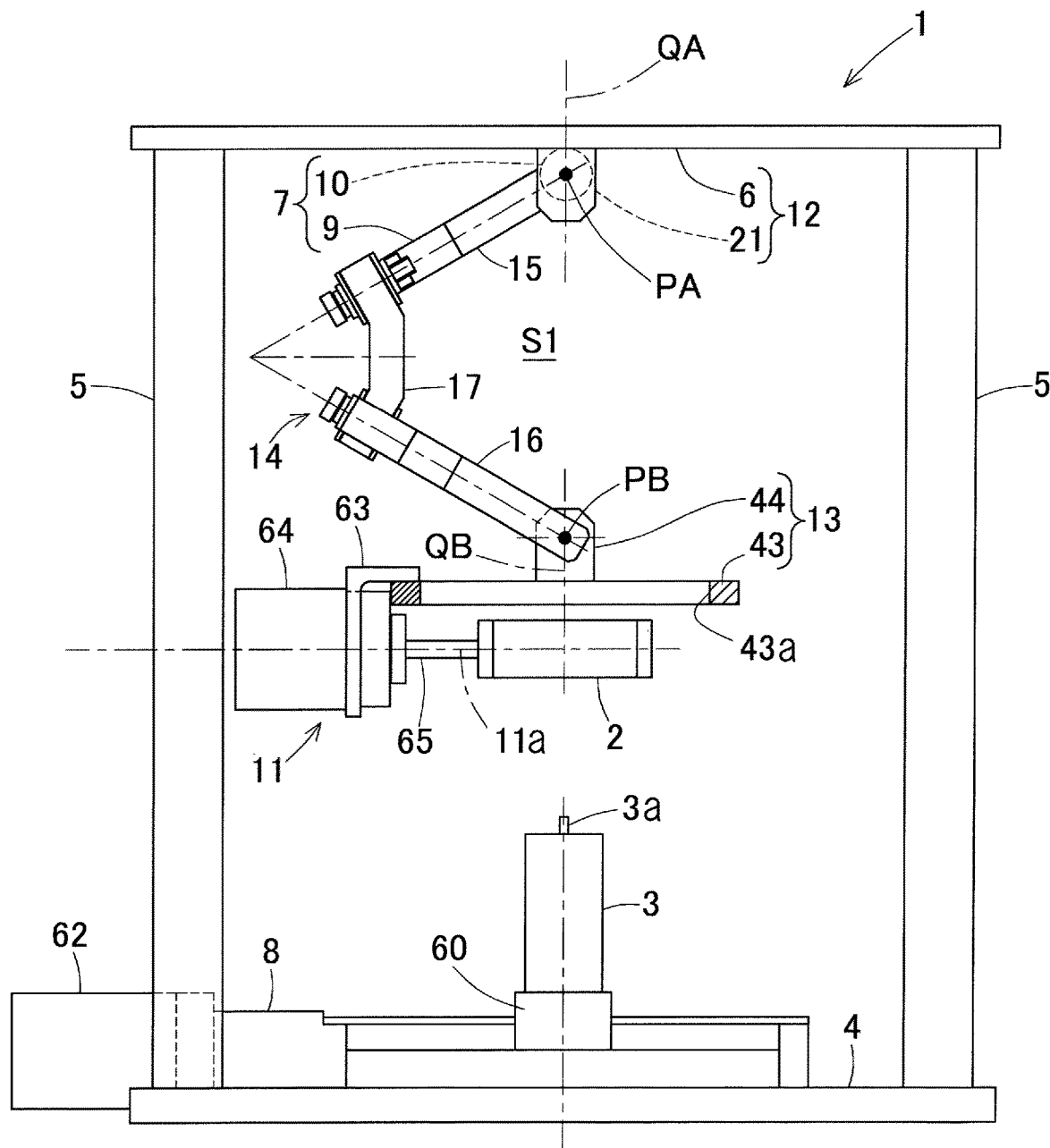
FIG. 10 is a front view of a work apparatus according to another embodiment of the present invention.

As shown in FIG. 10, the X-axis linear motion mechanism 8 may be mounted on the base plate 4, and the working body 3 may be fixed to the X-axis stage 60 of the X-axis linear motion mechanism 8 in a position in which the working body 3 is directed upward. The other configuration is the same as in FIG. 1. With this configuration, the necessity to dispose the working body 3 in the internal space S1 of the parallel link mechanism 9 is eliminated, so that designing becomes easy.

Figure 11:
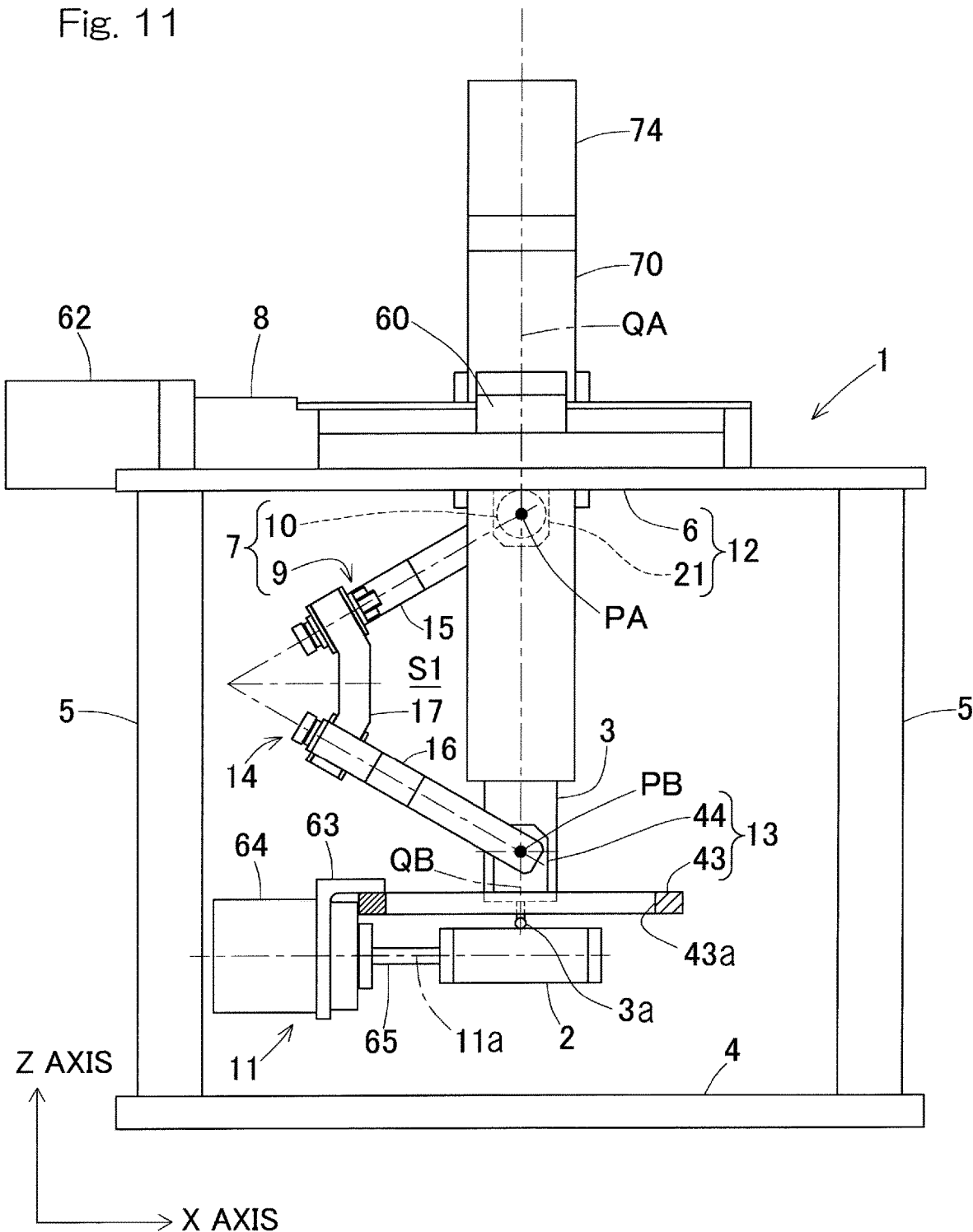
FIG. 11 is a front view of a work apparatus according to still another embodiment of the present invention.
Figure 12:
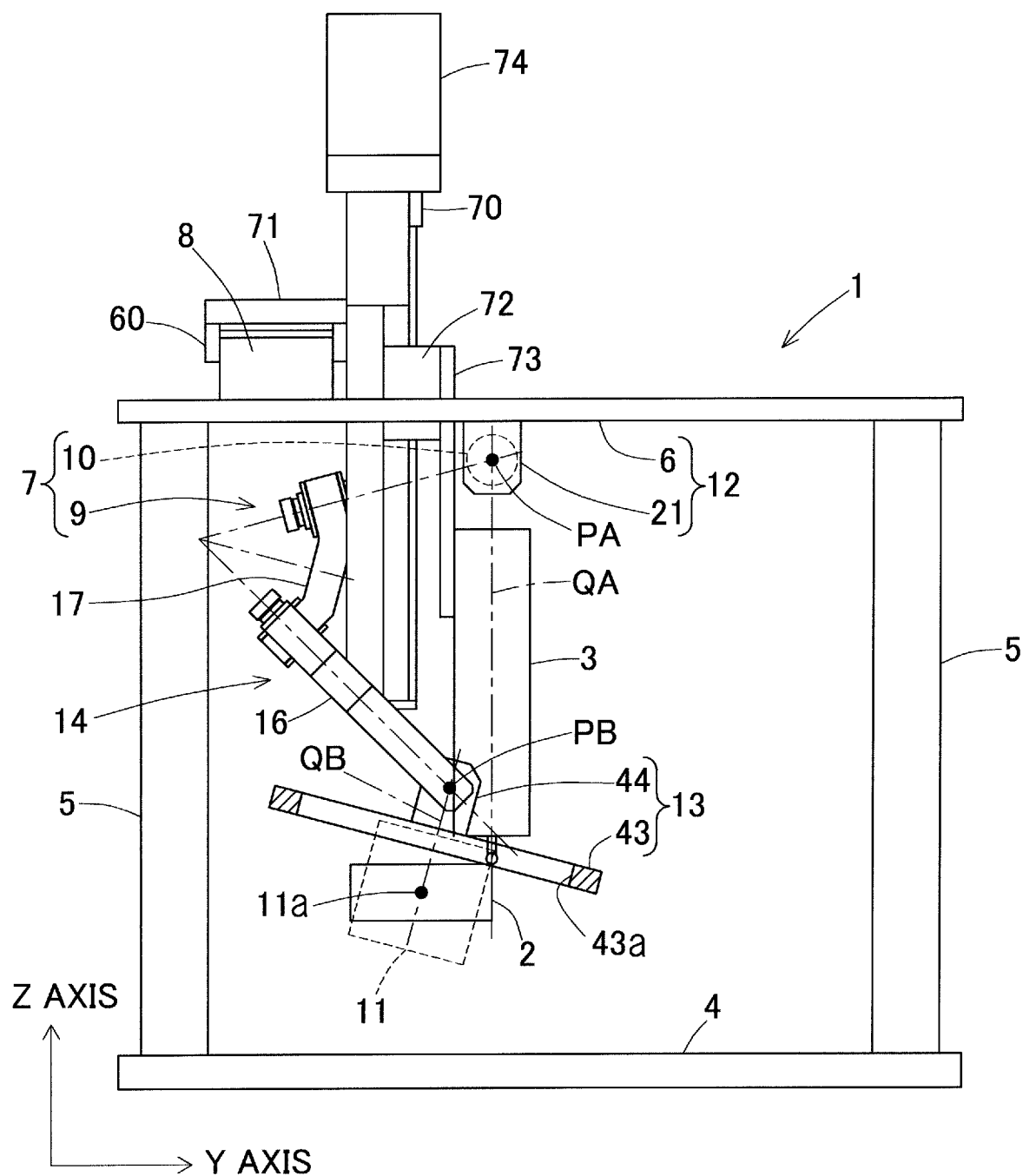
FIG. 12 is a side view of the work apparatus.
Figure 13:
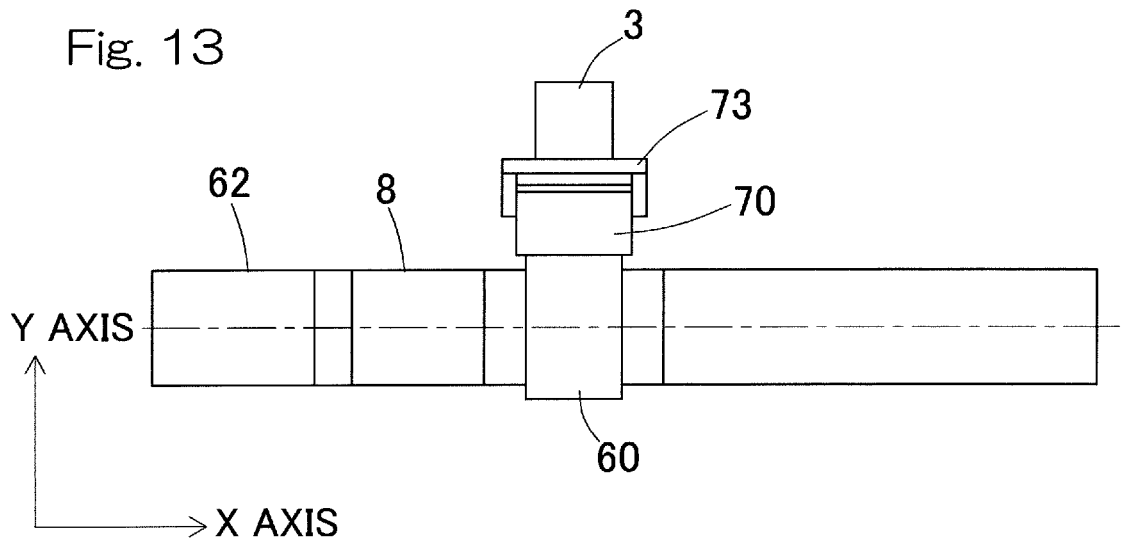
FIG. 13 is a plan view of an X-axis linear motion mechanism and a Z-axis linear motion mechanism of the work apparatus.

FIGS. 11 to 14C show another embodiment. As shown in FIGS. 11 to 13, the work apparatus 1 is an apparatus obtained by adding, to the embodiment in FIG. 1 to FIG. 9, a Z-axis linear motion mechanism 70 that moves the working body 3 in a direction (Z-axis direction) parallel to the central axis QA of the proximal end side link hub 12. The Z-axis linear motion mechanism 70 is an example of an additional linear motion mechanism recited in the claims.

A linear motion mechanism mounting member 71 (FIG. 12) is provided on the X-axis stage 60 of the X-axis linear motion mechanism 8 in place of the working body fixing member 61 (FIG. 2). The Z-axis linear motion mechanism 70 is mounted on the linear motion mechanism mounting member 71. The Z-axis linear motion mechanism 70 has a Z-axis stage 72 (FIG. 12) that is movable in the Z-axis direction, and the working body 3 is fixed to the Z-axis stage 72 via a working body fixing member 73 (FIG. 12) in a suspended position. A drive source that moves the Z-axis stage 72 is a motor 74. The working body 3 fixed to the Z-axis stage 72 moves in the Z-axis direction by driving the motor 74.

The working body 3 is configured to perform work on the work object 2 in a contact manner. The working body 3 may be, for example, a cutting machine having a rotary tool such as an end mill as the working portion 3a. The working body 3 is fixed to the working body fixing member 73 such that the working portion 3a is oriented downward. Similar to the embodiment in FIG. 1 to FIG. 9, the working portion 3a is located in the internal space S1 of the parallel link mechanism 9. The other configuration is similar to that in the embodiment in FIG. 1 to FIG. 9.

Similar to the embodiment in FIG. 1 to FIG. 9, the work apparatus 1 performs work on the work object 2 with the working body 3 while moving the work object 2 parallel to the X-Y plane. The method for moving the work object 2 parallel to the X-Y plane is the same as described above, and thus the description thereof is omitted.

Figure 14A:
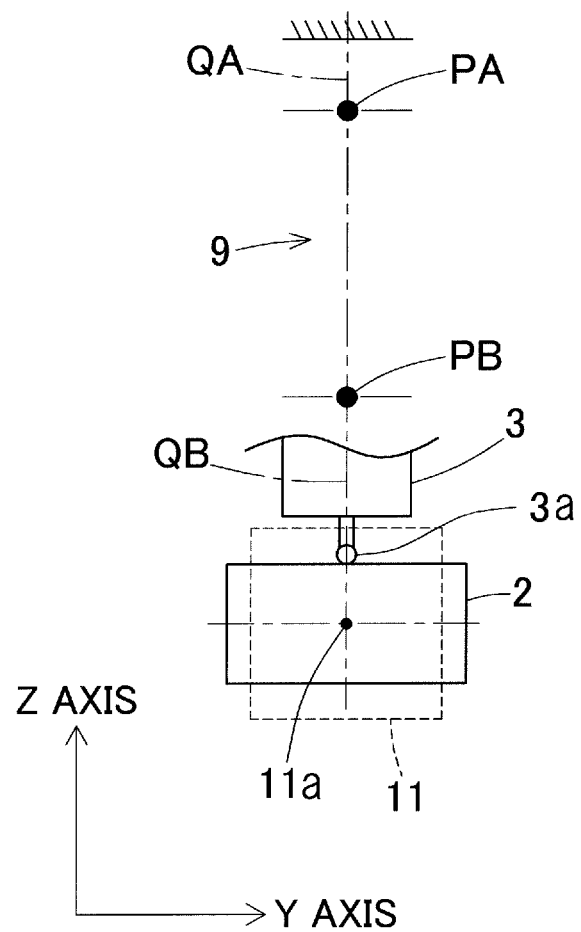
FIG. 14A is an explanatory diagram showing a state of work operation of the work apparatus.

Since the additional Z-axis linear motion mechanism 70 is provided, the work apparatus 1 can control the distance between the working body 3 and the work object 2 in the Z-axis direction, that is, in the direction parallel to the central axis QA of the proximal end side link hub 12. Thus, work to be performed with the working body 3 brought into contact with the work object 2 as shown in FIG. 14A is possible. Specifically, contact work is enabled by performing control as described below.

Figure 14B:
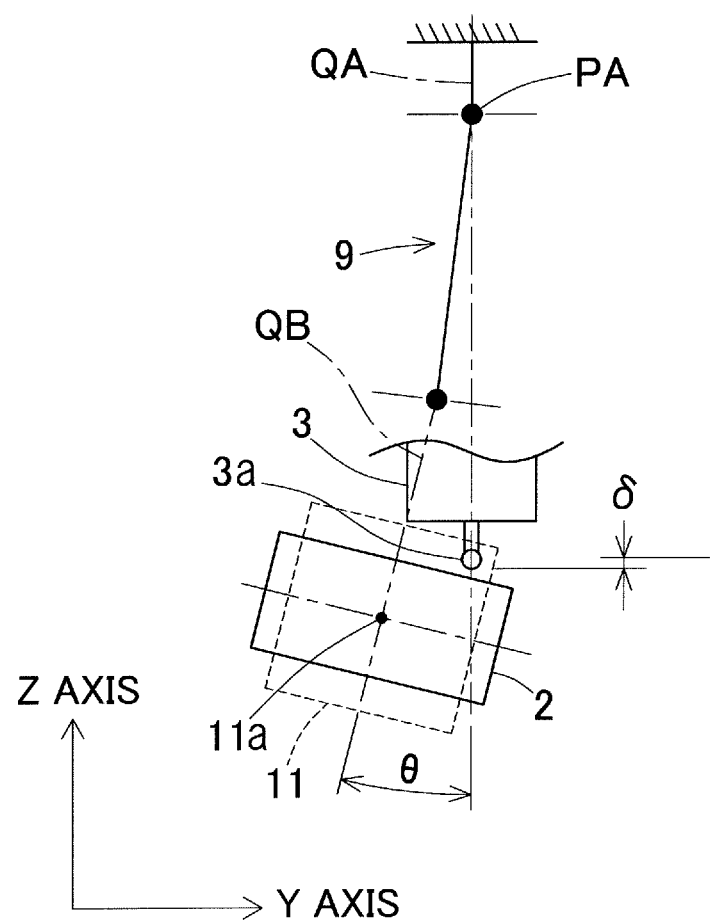
FIG. 14B is an explanatory diagram showing another state of the work operation of the work apparatus.
Figure 14C:
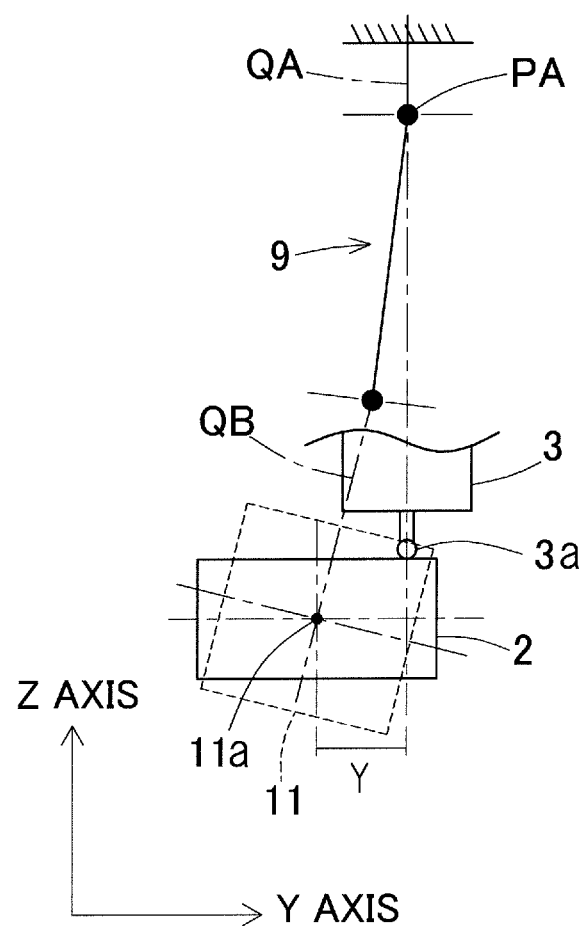
FIG. 14C is an explanatory diagram showing still another state of the work operation of the work apparatus.

As described above, in the case of moving the work object 2 parallel to the Y-axis direction, change of the tilt in the Y-axis direction of the work object 2 associated with operation of the parallel link mechanism 9 is corrected by rotating the work object 2 by the rotating mechanism 11 as shown in FIG. 14C while operating the parallel link mechanism 9 to move the work object 2 in the Y-axis direction as shown in FIG. 14B. At this time, as a result of the rotation of the work object 2, a work position at which the work object 2 performs work changes in the Z-axis direction by a distance δ. The position in the Z-axis direction of the working body 3 is corrected by the Z-axis linear motion mechanism 70 in accordance with the change in the Z-axis direction of the work position. Also regarding work to be performed in a state where the working body 3 and the work object 2 are not in contact with each other, it is possible to perform work with the distance between the working body 3 and the work object 2 maintained constant, by correcting the position in the Z-axis direction of the working body 3, similar to the above.

Figure 15:
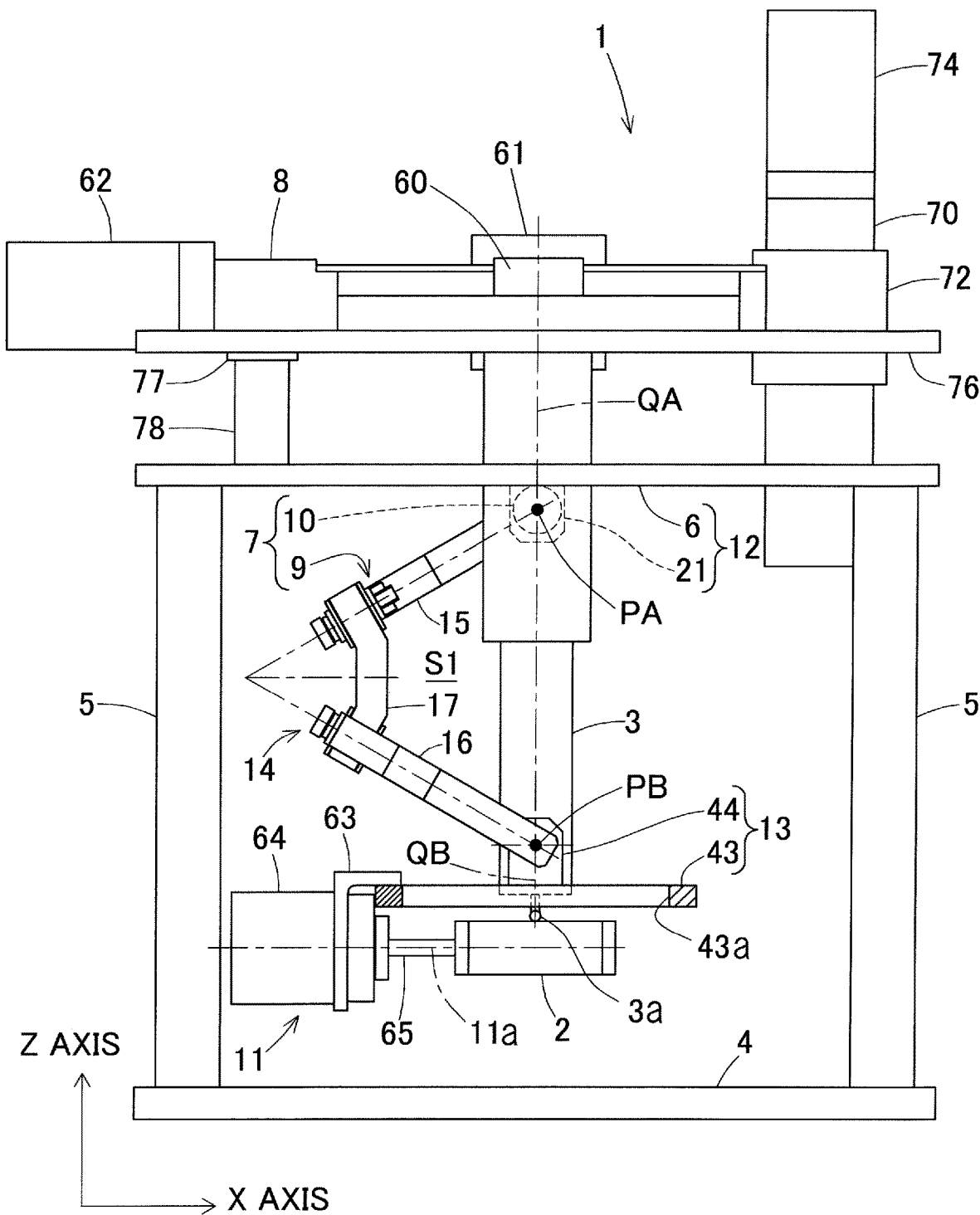
FIG. 15 is a front view of a work apparatus according to still another embodiment of the present invention.

The work apparatus 1 shown in FIG. 15 is different from the embodiment in FIG. 11 to FIG. 14 in the arrangement of the X-axis linear motion mechanism 8 and the Z-axis linear motion mechanism 70. Specifically, the Z-axis linear motion mechanism 70 is mounted on one end in the X-axis direction of the proximal end member 6, and a stationary base 76 for X-axis linear motion mechanism mounting is fixed to the Z-axis stage 72 of the Z-axis linear motion mechanism 70. A linear bush 77 is provided at another end in the X-axis direction of the stationary base 76, and a shaft 78 fixed at a lower end thereof to the proximal end member 6 is inserted through the linear bush 77 so as to extend in the Z-axis direction. Accordingly, the stationary base 76 is movable in the Z-axis direction while being inhibited from moving in any direction other than the Z-axis direction. The X-axis linear motion mechanism 8 is mounted on the stationary base 76, and the working body 3 is fixed to the X-axis stage 60 of the X-axis linear motion mechanism 8 via the working body fixing member 61.

In other words, whereas the X-axis linear motion mechanism 8, the Z-axis linear motion mechanism 70, and the working body 3 are supported with respect to the proximal end member 6 in this order in the embodiment in FIG. 11 to FIG. 14, the Z-axis linear motion mechanism 70, the X-axis linear motion mechanism 8, and the working body 3 are supported with respect to the proximal end member 6 in this order in the configuration in FIG. 15. In the configuration in FIG. 15, the stationary base 76 for X-axis linear motion mechanism mounting is required, and, in order to prevent interference between each link mechanism 14 of the parallel link mechanism 9 and the stationary base 76, the stationary base 76 is disposed above the proximal end member 6. The other configuration is the same as in FIG. 11 to FIG. 14.

Figure 16:
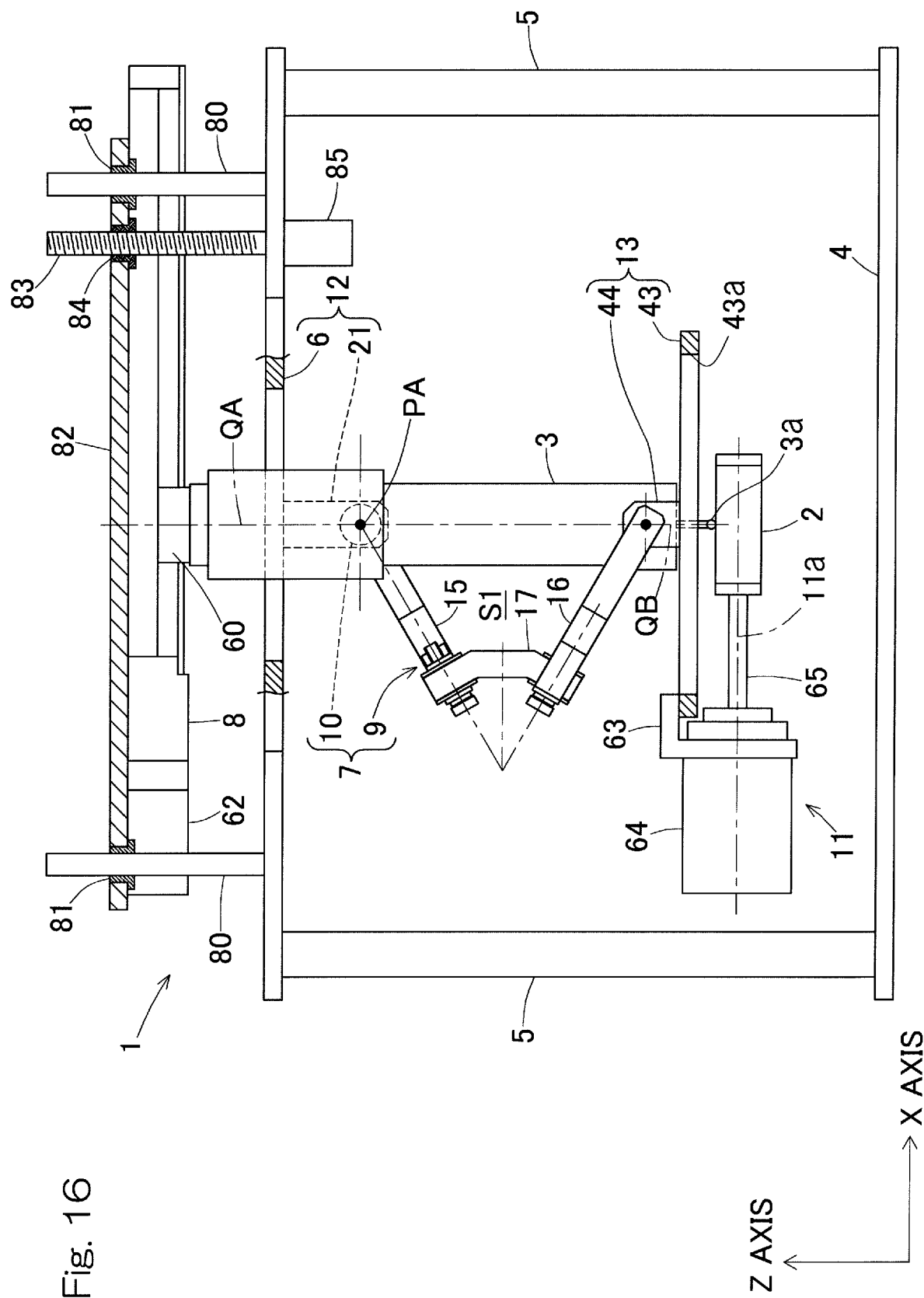
FIG. 16 is a front view of a work apparatus according to still another embodiment of the present invention.

The work apparatus 1 in FIG. 16 is different from the embodiment in FIG. 15 in the configuration of the Z-axis linear motion mechanism 70. Specifically, the Z-axis linear motion mechanism 70 has a configuration using a ball screw mechanism, a lifting/lowering base 82 is guided by a plurality of shafts 80 extending upward from the proximal end member 6, via a linear bush 81 so as to be movable up or down, and the X-axis linear motion mechanism 8 is mounted on the lower surface of the lifting/lowering base 82. A screw shaft 83 extends from the proximal end member 6 upward and parallel to the shafts 80, and a nut 84 provided in the lifting/lowering base 82 is screwed to the screw shaft 83. When the screw shaft 83 is rotated by a motor 85, the lifting/lowering base 82 moves up or down. The other configuration is the same as in FIG. 15.

The Z-axis linear motion mechanism 70 using the ball screw mechanism has a simple configuration and also has an advantage in that the height of the work apparatus 1 can be decreased, as compared to the Z-axis linear motion mechanism 70 of the embodiment in FIG. 11 to FIG. 14 and the Z-axis linear motion mechanism 70 of the embodiment in FIG. 15.

Figure 17:
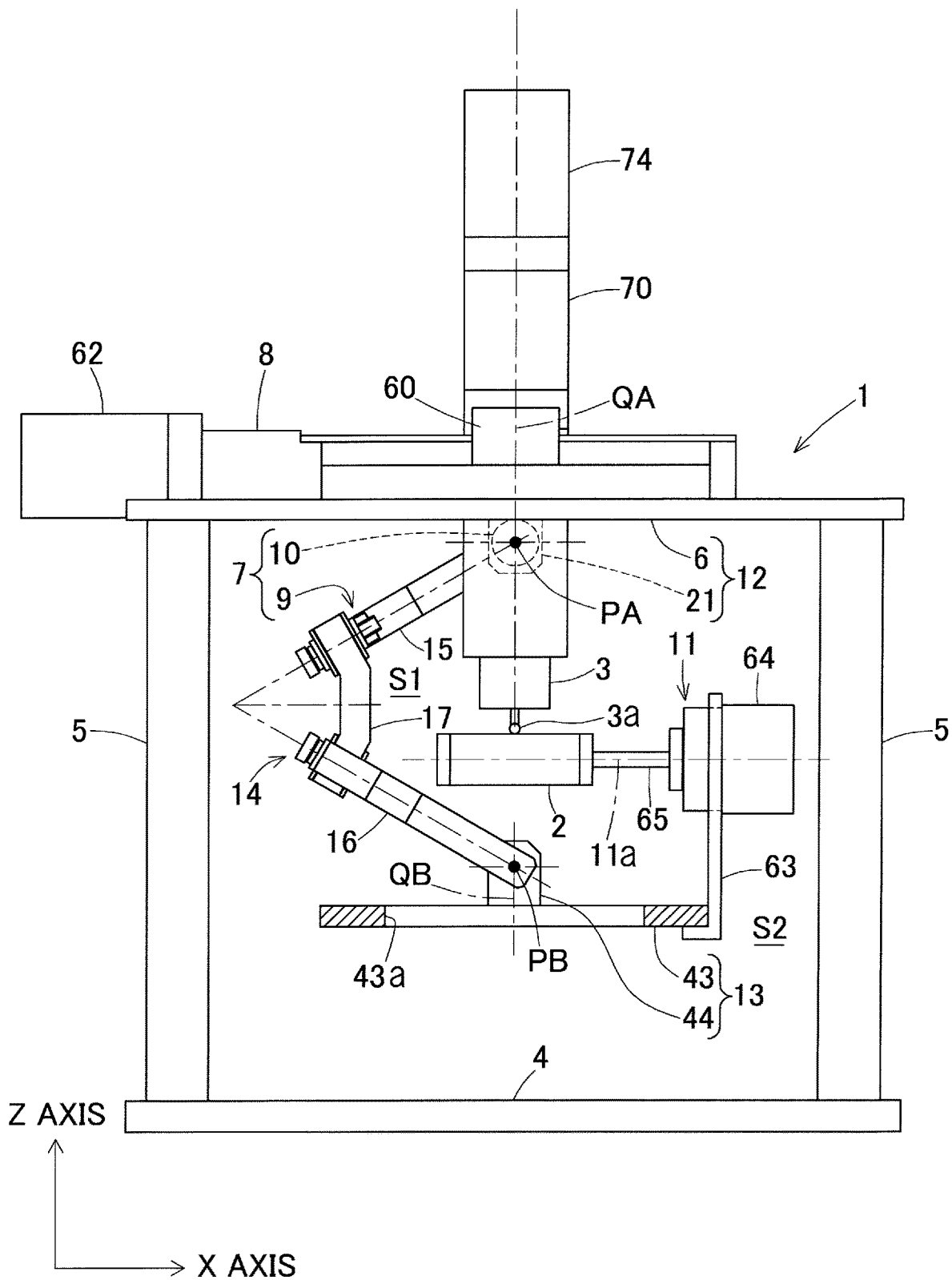
FIG. 17 is a front view of a work apparatus according to still another embodiment of the present invention.
Figure 18:
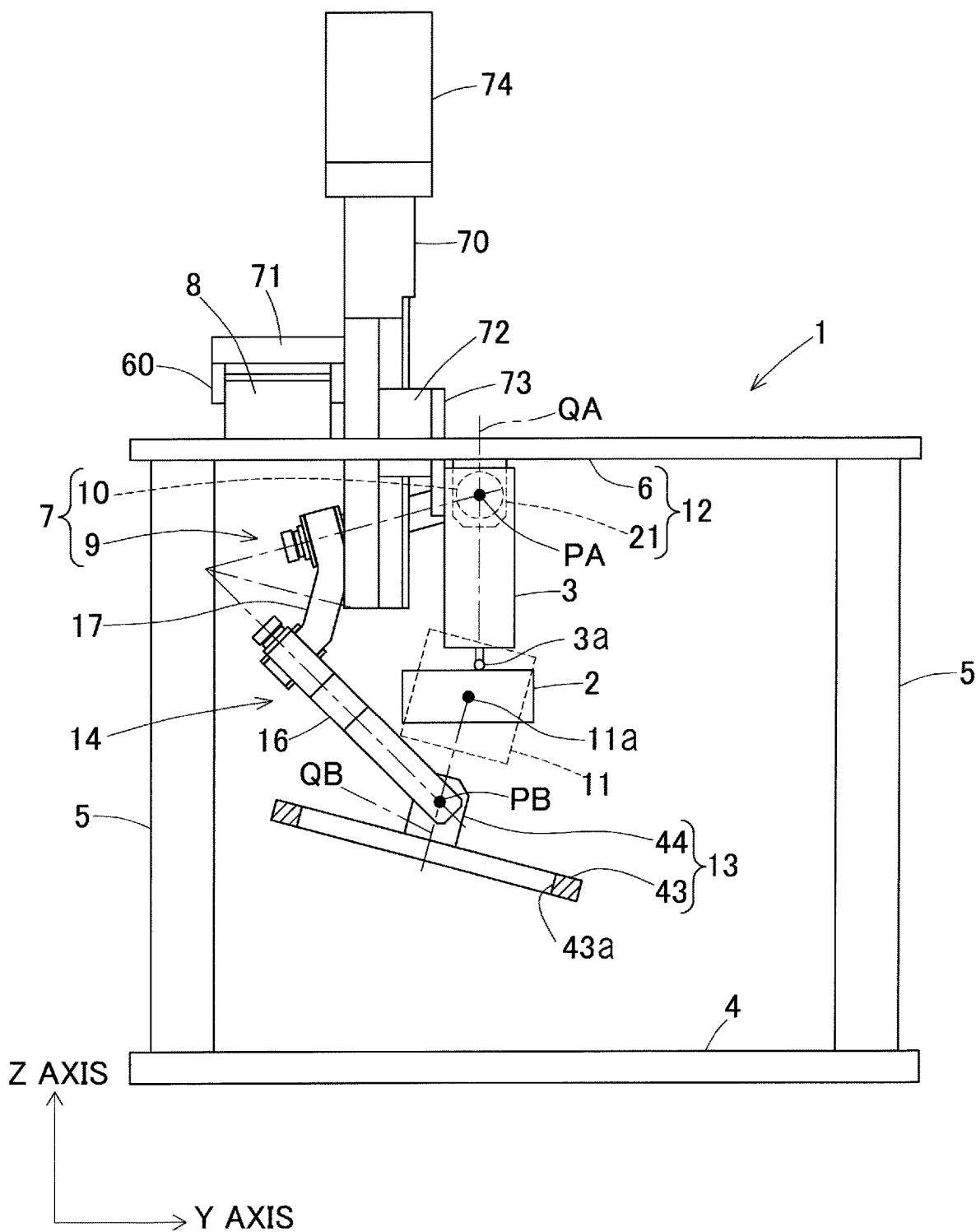
FIG. 18 is a side view of the work apparatus.

The work apparatus 1 shown in FIG. 17 and FIG. 18 is an apparatus obtained by disposing the work object 2 in the internal space S1 of the parallel link mechanism 9 in the configuration of the embodiment in FIG. 11 to FIG. 14. The work object 2 is fixed to the distal end of the work object fixing member 65 and located in the internal space S1. The rotating mechanism 11 is disposed in an outer space S2 that is a space outside the internal space S1.

With this configuration, the working body 3 and control devices such as the position control actuators 10 for the parallel link mechanism 9, the X-axis linear motion mechanism 8, and the motor for the Z-axis linear motion mechanism 70 are not disposed below the work object 2. Thus, chips and the like generated from the work object 2, and grease, paint, and the like adhering to the work object 2 can be prevented from adhering to the working body 3 and the control devices and adversely affecting these components. In addition, since the working body 3 is disposed in the internal space S1, the entire configuration can be made further compact.

Although the modes for carrying out the present invention have been described on the basis of the embodiments, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . Work apparatus
2 . . . Work object
3 . . . Working body
6 . . . Proximal end member (Member forming part of proximal end side link hub)
8 . . . X-axis linear motion mechanism (Linear motion mechanism)
9 . . . Parallel link mechanism
10 . . . Position control actuator
11 . . . Rotating mechanism
11a . . . Rotation center axis
12 . . . Proximal end side link hub
13 . . . Distal end side link hub
14 . . . Link mechanism
15 . . . Proximal side end link member
16 . . . Distal side end link member
17 . . . Intermediate link member
63 . . . Rotating mechanism mounting member
65 . . . Work object fixing member
70 . . . Z-axis linear motion mechanism (additional linear motion mechanism)
O1 . . . Central axis of revolute pair between link hub and end link member
O2 . . . Central axis of revolute pair between end link member and intermediate link member
PA, PB . . . Spherical link center
QA, QB . . . Central axis of link hub
RP1 . . . First revolute pair
RP2 . . . Second revolute pair
RP3 . . . Third revolute pair
RP4 . . . Fourth revolute pair
S1 . . . Internal space

What is claimed is:

1. A work apparatus for performing work on a work object with a working body in a contact manner or in a non-contact manner, the work apparatus comprising:
a parallel link mechanism supporting the work object in a position-changeable fashion;
a position control actuator configured to operate the parallel link mechanism;
a linear motion mechanism configured to move the working body in one axial direction relative to the parallel link mechanism; and
a rotating mechanism configured to rotate the work object, wherein
the parallel link mechanism includes three or more link mechanisms coupling a distal end side link hub to a proximal end side link hub such that a position of the distal end side link hub can be changed relative to the proximal end side link hub,
each of the link mechanisms includes
a proximal side end link member pivotably coupled at one end thereof to the proximal end side link hub via a first revolute pair,
a distal side end link member pivotably coupled at one end thereof to the distal end side link hub via a second revolute pair, and
an intermediate link member with its opposite ends pivotably coupled to the other end of the proximal side end link member via a third revolute pair and to the other end of the distal side end link member via a fourth revolute pair, respectively,
each of the link mechanisms is disposed such that a central axis of the first revolute pair and a central axis of the third revolute pair intersect each other at a proximal end side spherical link center, and a central axis of the second revolute pair and a central axis of the fourth revolute pair intersect each other at a distal end side spherical link center,
the position control actuator is provided in each of two or more link mechanisms of the three or more link mechanisms such that the position of the distal end side link hub relative to the proximal end side link hub is arbitrarily changed,
the linear motion mechanism is configured to move the working body in an axial direction orthogonal to a proximal end side link hub central axis that is defined as a straight line that passes through the proximal end side spherical link center and intersects the central axis of the first revolute pair at a right angle, and
the rotating mechanism is mounted on the distal end side link hub and is configured to rotate the work object about a rotation center axis which is parallel to a movement direction of the linear motion mechanism in a state where the proximal end side link hub central axis and a distal end side link hub central axis that is defined as a straight line that passes through the distal end side spherical link center and intersects the central axis of the second revolute pair at a right angle are on the same line.

2. The work apparatus as claimed in claim 1, wherein the linear motion mechanism is mounted on a member that forms a part of the proximal end side link hub of the parallel link mechanism.

3. The work apparatus as claimed in claim 1, wherein an additional linear motion mechanism configured to move the working body in a direction parallel to the proximal end side link hub central axis is provided.

4. The work apparatus as claimed in claim 1, wherein the parallel link mechanism is mounted such that the distal end side link hub is oriented downward, and the working body is disposed in an internal space of the parallel link mechanism that is a space formed between the proximal end side link hub and the distal end side link hub.

5. The work apparatus as claimed in claim 1, wherein a rotating mechanism mounting member fixed to the distal end side link hub is provided outside an internal space of the parallel link mechanism that is a space formed between the proximal end side link hub and the distal end side link hub, the rotating mechanism is mounted on the rotating mechanism mounting member, and a work object fixing member that is configured to be rotated by the rotating mechanism and has a tip portion extending into the internal space and configured to fix the work object is provided.

6. The work apparatus as claimed in claim 2, wherein an additional linear motion mechanism configured to move the working body in a direction parallel to the proximal end side link hub central axis is provided.

7. The work apparatus as claimed in claim 2, wherein the parallel link mechanism is mounted such that the distal end side link hub is oriented downward, and the working body is disposed in an internal space of the parallel link mechanism that is a space formed between the proximal end side link hub and the distal end side link hub.

8. The work apparatus as claimed in claim 3, wherein the parallel link mechanism is mounted such that the distal end side link hub is oriented downward, and the working body is disposed in an internal space of the parallel link mechanism that is a space formed between the proximal end side link hub and the distal end side link hub.

9. The work apparatus as claimed in claim 2, wherein a rotating mechanism mounting member fixed to the distal end side link hub is provided outside an internal space of the parallel link mechanism that is a space formed between the proximal end side link hub and the distal end side link hub, the rotating mechanism is mounted on the rotating mechanism mounting member, and a work object fixing member that is configured to be rotated by the rotating mechanism and has a tip portion extending into the internal space and configured to fix the work object is provided.

10. The work apparatus as claimed in claim 3, wherein a rotating mechanism mounting member fixed to the distal end side link hub is provided outside an internal space of the parallel link mechanism that is a space formed between the proximal end side link hub and the distal end side link hub, the rotating mechanism is mounted on the rotating mechanism mounting member, and a work object fixing member that is configured to be rotated by the rotating mechanism and has a tip portion extending into the internal space and configured to fix the work object is provided.

11. The work apparatus as claimed in claim 4, wherein a rotating mechanism mounting member fixed to the distal end side link hub is provided outside the internal space of the parallel link mechanism that is the space formed between the proximal end side link hub and the distal end side link hub, the rotating mechanism is mounted on the rotating mechanism mounting member, and a work object fixing member that is configured to be rotated by the rotating mechanism and has a tip portion extending into the internal space and configured to fix the work object is provided.

* * * * *